United States Patent [19]
Wilcox et al.

[11] Patent Number: 5,664,189
[45] Date of Patent: *Sep. 2, 1997

[54] METHOD AND APPARATUS FOR PROVIDING OBJECT-ORIENTED FILE STRUCTURING SYSTEM ON A COMPUTER

[75] Inventors: Jonathan J. Wilcox, Woodside; Thomas A. Henderson, Palo Alto; Jon A. Wilcox, Menlo Park, all of Calif.

[73] Assignee: Menai Corporation, Menlo Park, Calif.

[*] Notice: The term of this patent shall not extend beyond the expiration date of Pat. No. 5,568,639.

[21] Appl. No.: 731,844

[22] Filed: Oct. 21, 1996

Related U.S. Application Data

[63] Continuation of Ser. No. 158,591, Nov. 24, 1993, Pat. No. 5,568,639.
[51] Int. Cl.⁶ .................. G06F 7/00; G06F 9/00
[52] U.S. Cl. .................. 395/621; 395/614; 711/170; 711/171; 711/172; 711/173
[58] Field of Search .................. 395/621, 614, 395/497.01, 497.02, 497.03, 497.04

[56] References Cited

U.S. PATENT DOCUMENTS

| | | |
|---|---|---|
| 4,989,132 | 1/1991 | Mellender et al. ............ 395/705 |
| 5,129,083 | 7/1992 | Cutler et al. ............ 395/614 |
| 5,179,685 | 1/1993 | Nojiri ............ 395/800 |
| 5,247,658 | 9/1993 | Barrett et al. ............ 395/601 |
| 5,297,279 | 3/1994 | Bannon et al. ............ 395/614 |
| 5,319,778 | 6/1994 | Catino ............ 395/613 |
| 5,371,885 | 12/1994 | Letwin ............ 395/621 |
| 5,437,027 | 7/1995 | Bannon et al. ............ 395/614 |
| 5,544,302 | 8/1996 | Nguyen ............ 395/326 |
| 5,581,760 | 12/1996 | Atkinson et al. ............ 395/702 |

*Primary Examiner*—Thomas G. Black
*Assistant Examiner*—Jean Raymond Homere
*Attorney, Agent, or Firm*—Hecker & Harriman

[57] ABSTRACT

The present invention provides an object-oriented file structuring system. The invention provides a method of defining DATA objects and CONTAINER objects and SYSTEM objects that facilitates navigation through a file structuring system. Notation and nomenclature are defined for building files composed of CONTAINERs and DATA and SYSTEM objects and for defining relationships between and among files, CONTAINERs and DATA. A FOCUS LIST tracks objects of interest and aids in NAVIGATION. CONTAINER objects contain other objects. DATA objects enclose DATA in either machine-dependent or machine-independent value representations. Developers work with logical files and can freely create and modify the logical relationships of file objects. A RECONSTITUTION algorithm periodically updates the physical file to correspond to the logical file.

20 Claims, 8 Drawing Sheets

FIG. 1
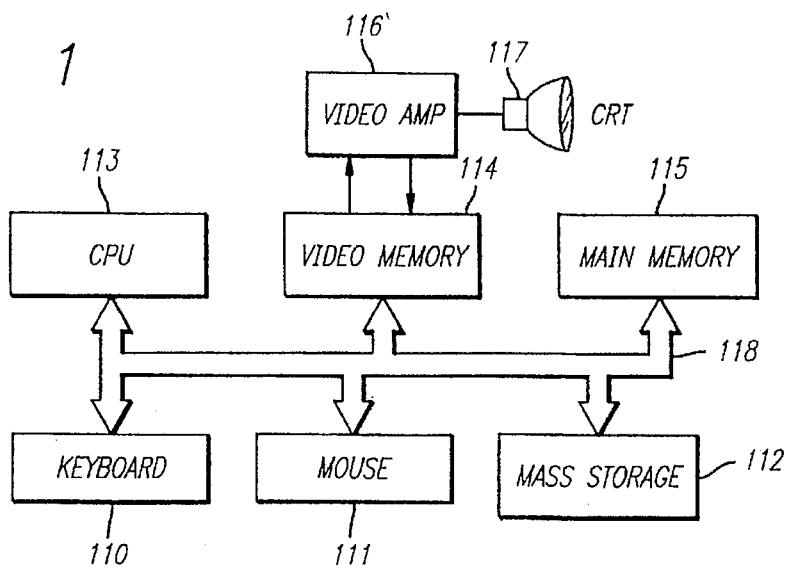
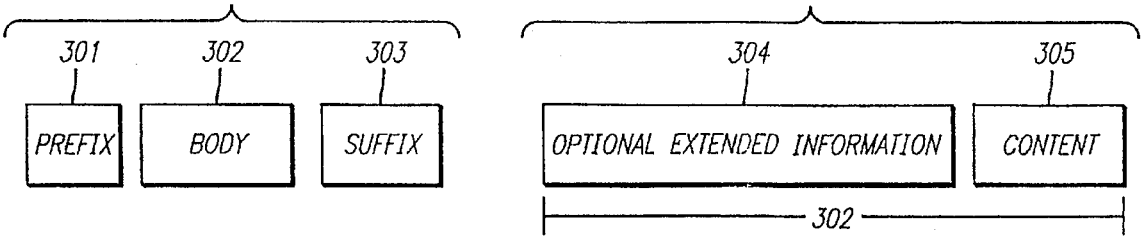
FIG. 3A
FIG. 3B
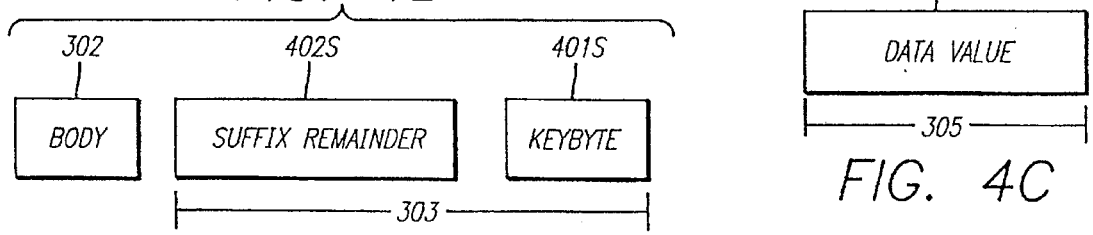
FIG. 4A
FIG. 4B
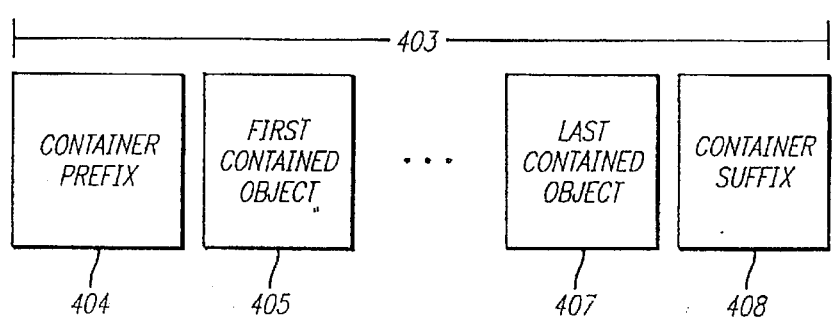
FIG. 4D

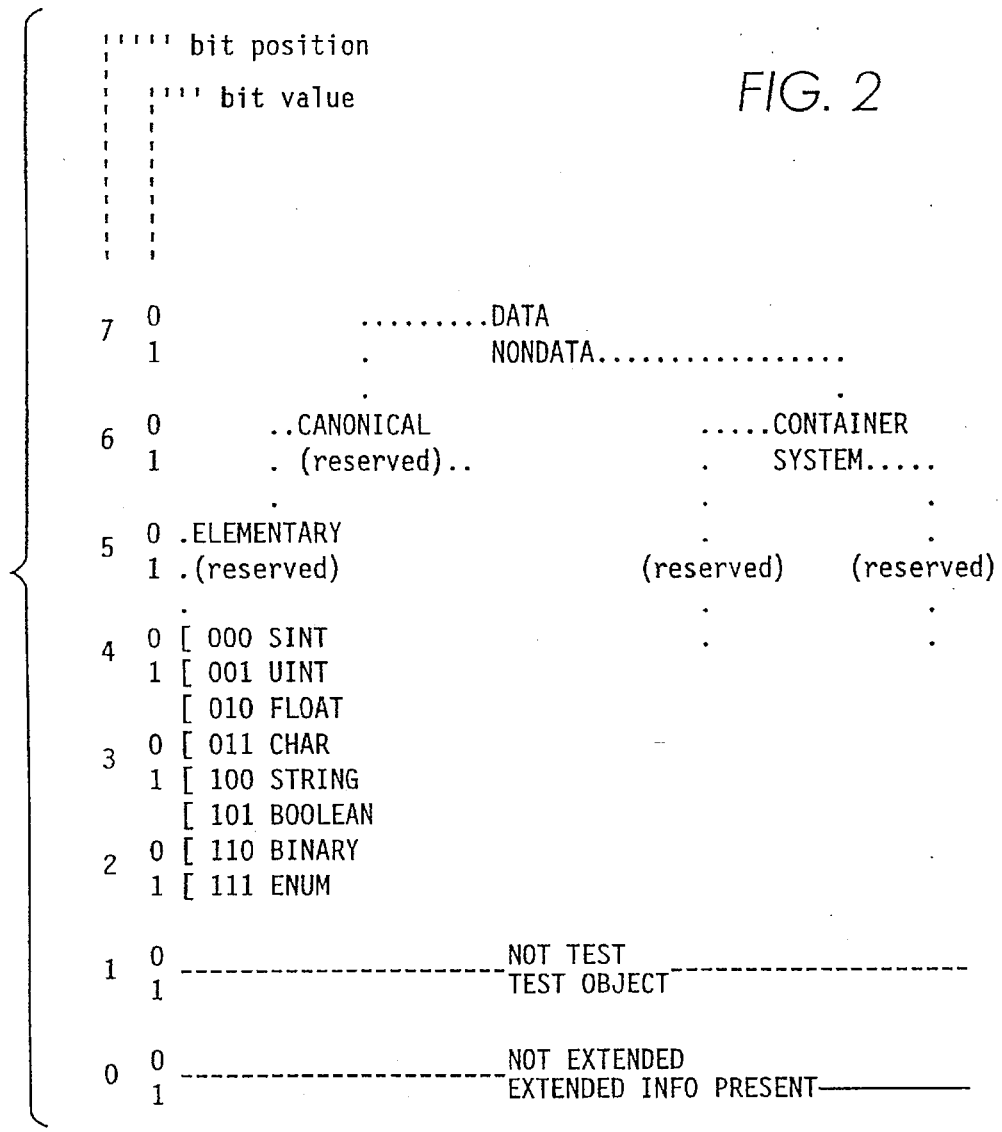
FIG. 2
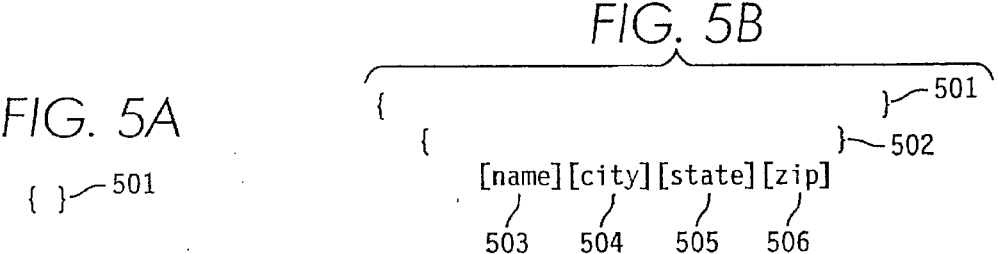
FIG. 5A
FIG. 5B
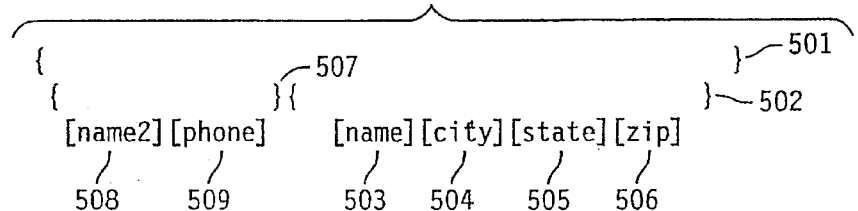
FIG. 5C

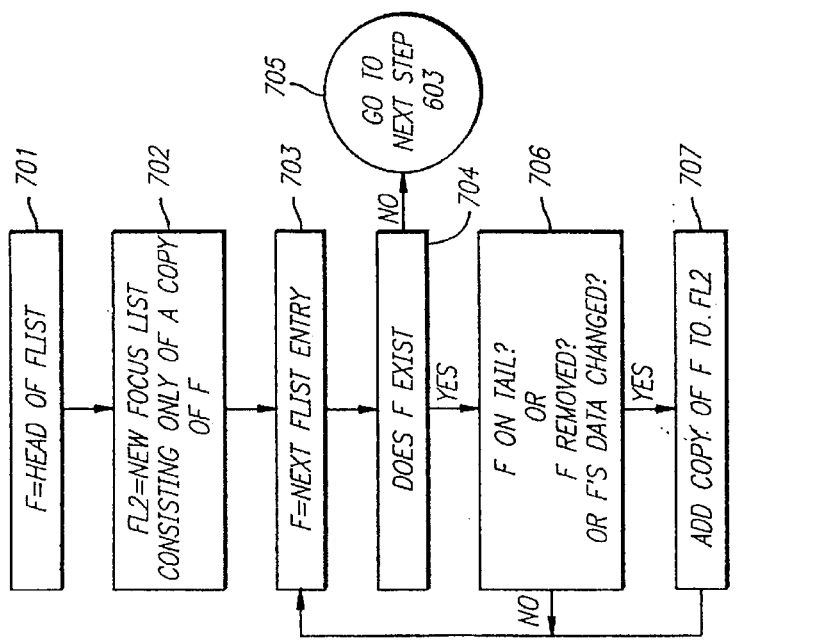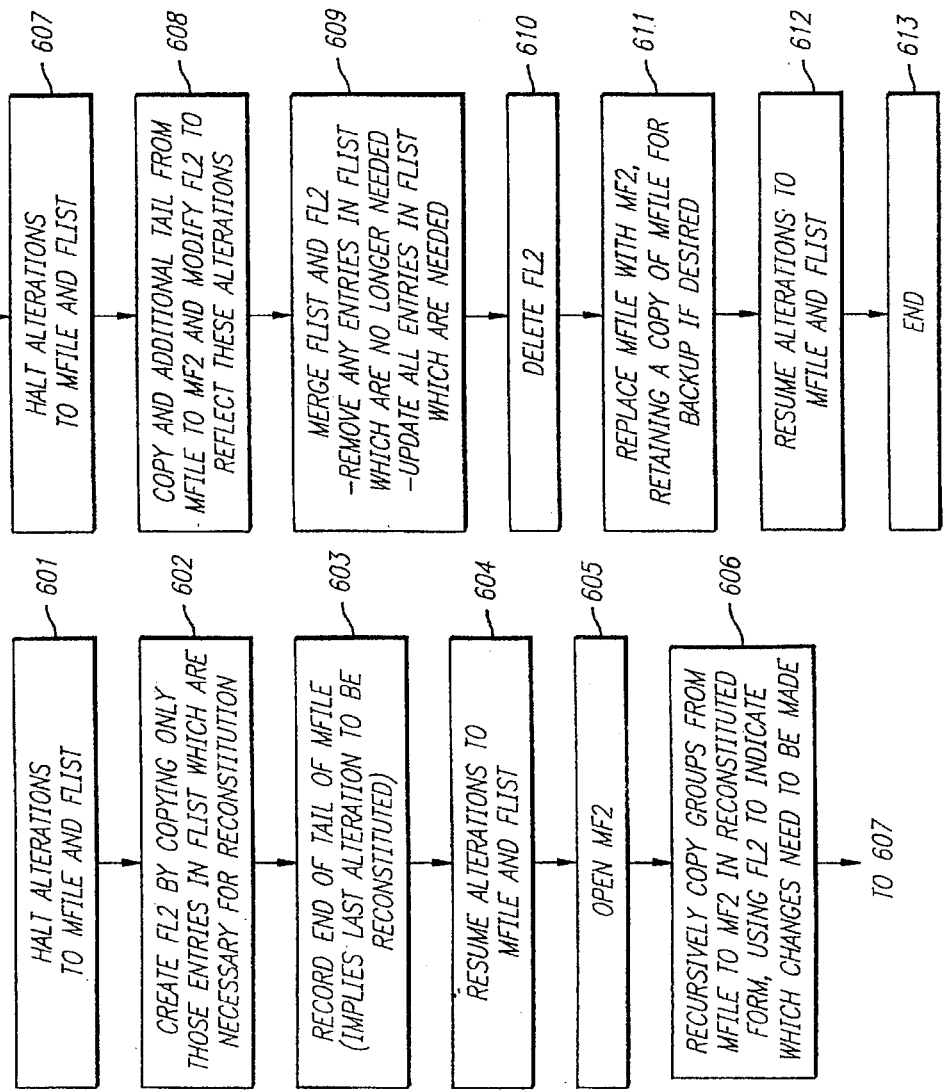

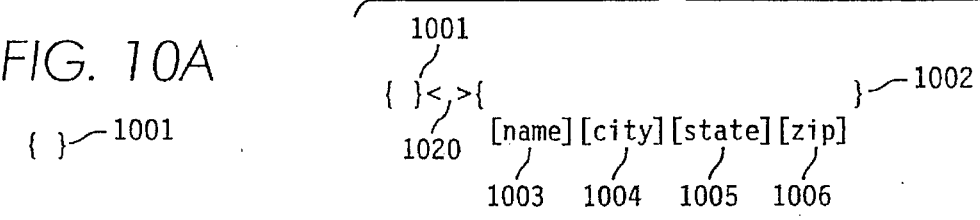
FIG. 10A
FIG. 10B
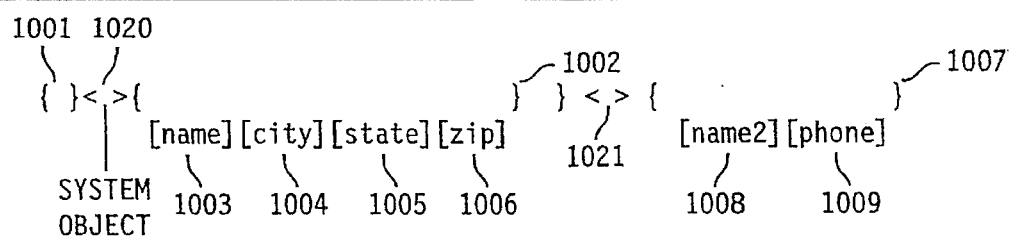
FIG. 10C
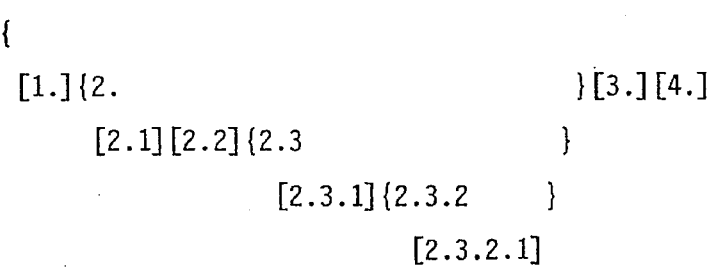
FIG. 17A
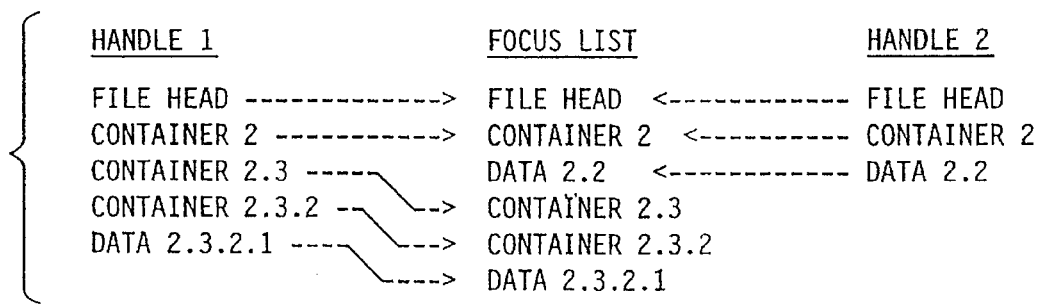
FIG. 17B

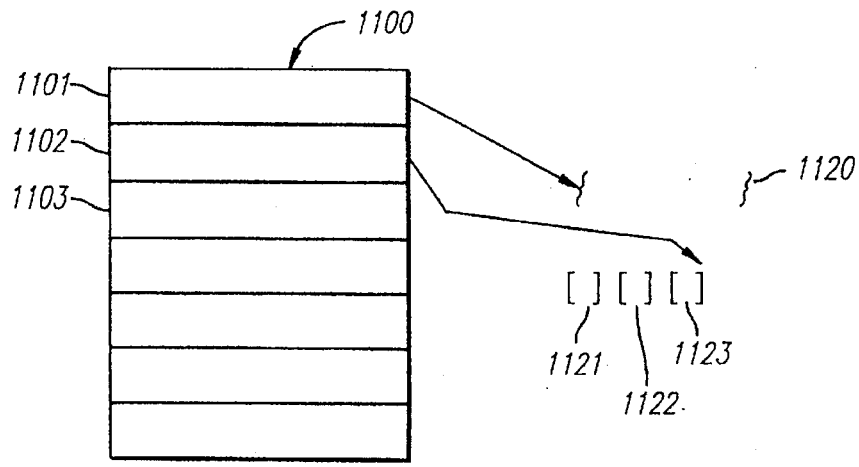
FIG. 11
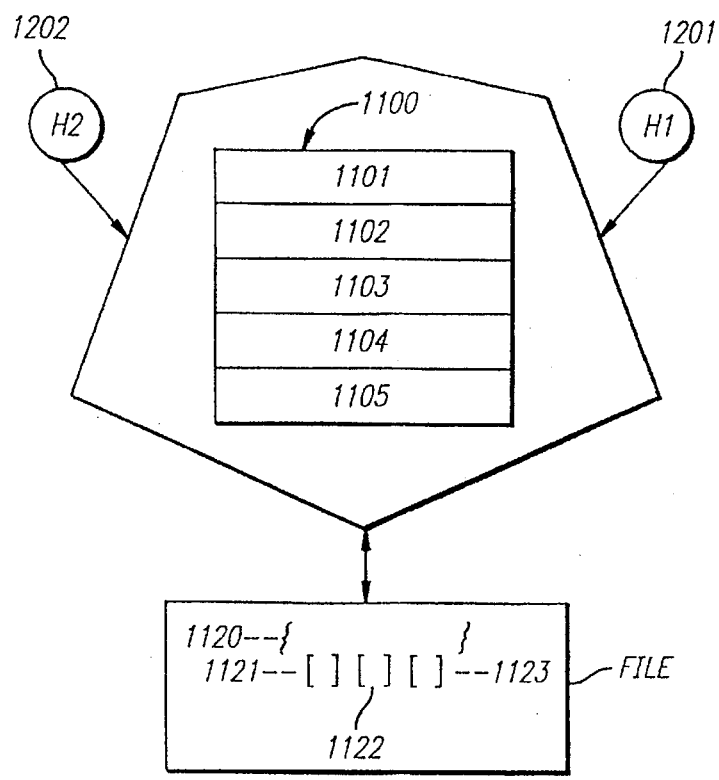
FIG. 12
FIG. 13
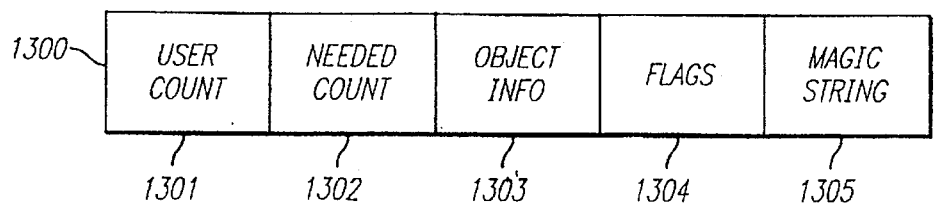

FIG. 14A
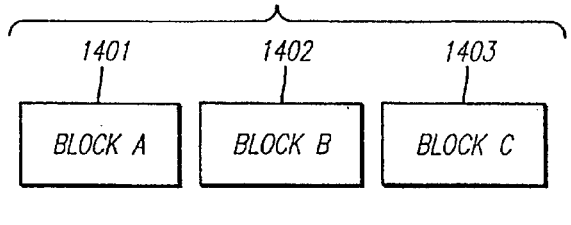
FIG. 14B
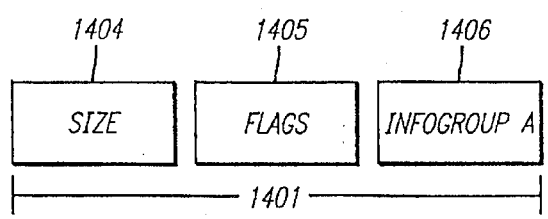
FIG. 14C
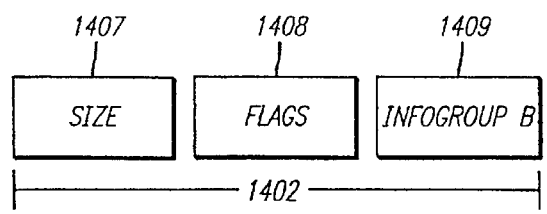
FIG. 14D
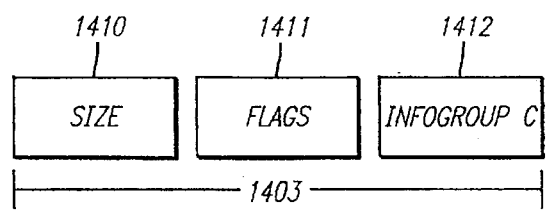
FIG. 14E
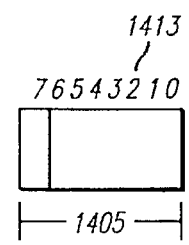
FIG. 14F
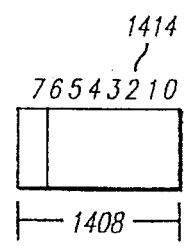
FIG. 14G
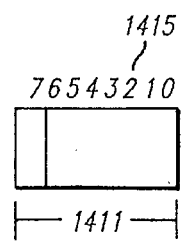
FIG. 15A
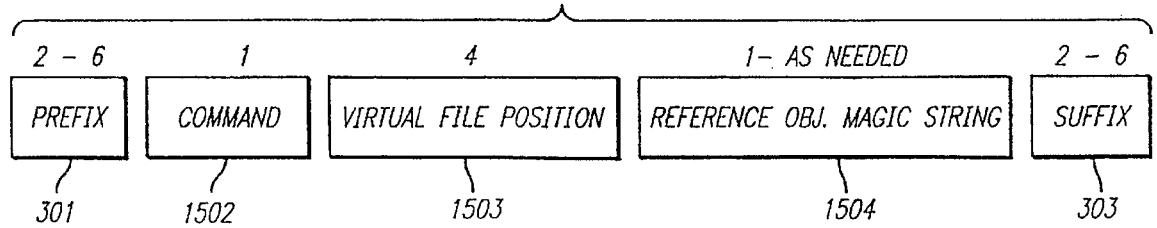
FIG. 15B
```
COMMAND VALUES:
    NOALT = 0
    INSERT
    APPEND
    REPLACE
    REMOVE
    BEGINT
    ENDT
    APPENDPREFIRST
    INSERTPOSTLAST
        :
```

METHOD AND APPARATUS FOR PROVIDING OBJECT-ORIENTED FILE STRUCTURING SYSTEM ON A COMPUTER

This is a continuation of application Ser. No. 08/158,591, filed Nov. 24, 1993, now U.S. Pat. No. 5,568,639

BACKGROUND OF THE PRESENT INVENTION

1. Field of the Invention

This invention relates to the field of computer file structuring systems.

2. Background Art

Data storage and manipulation is an important function of a computer system. A central processing unit (CPU) of a computer system cannot perform useful services unless data can be presented to it and received from it.

One way in which data can be organized for CPU access, including access for the purposes of finding, writing, reading and erasing part or all of that data, is in the form of a "file." A file is an apparently contiguous sequence of atomic components of data known as bytes.

A byte is the smallest unit of data which can be managed directly by the hardware of a computer. A byte is composed of bits, each of which holds the binary value of 0 or 1. A byte is typically defined as eight bits.

A unit of data within a file may consist of one or more bytes. The significance of the data units in a file depends upon the number of bytes in the unit, the placement of the data unit within the file, the scheme by which the resultant pattern of bits should be interpreted, and the value represented by that interpretation.

File management facilities of a computer system provide the means by which a file can be accessed by application programs as an abstract data stream. These file management facilities include the operating system of the computer, simple file input/output functions typically supplied with computer language assemblers and compilers, persistent storage device drivers and the hardware circuits and embedded control software of computer memory systems.

A file may be considered as a continuous extent of bytes presented by the underlying computer file management facilities. According to this abstraction, the file has an address at which it begins and an unbroken length of component bytes. This is the appearance of files as commonly presented for programmer access by computer file management facilities.

Computer files may be data files or executable files. This distinction is not absolute, because it is possible for a data file to enclose an executable file (in which case it is not immediately available for execution) or to enclose executable routines which can serve as sub-parts of programs. Nevertheless, for present purposes the general distinction can be used to identify data storage as the purpose of the present invention and of the prior art which relates to the present invention.

The organization of data within a file is known as the file format. File formats are not ordinarily managed by the file management facilities of a computer, but rather are defined by programmers and are specific to a given computer program and architecture. There is no universal file format which would make the data created by one computer or one program inherently accessible to any other computer or program. Data written by one program may not be understandable by another and data written on one computer may not be readable on a different computer without reformatting of the data. The need for organization of data within files is a typical problem addressed by programmers. Various approaches have been made to the general problem of data storage and management, but current practice methods of data storage do not provide consistency of file formatting so as to allow the same format to be used for simple, direct file access and for sophisticated data management.

Prior art approaches include: (1) direct file access, (2) formatted data storage with limited data management, and (3) database management systems. In some cases the programmer must design all details of the file format and all procedures of the data management. In other cases data base management systems (DBMS) provide data management but require the programmer to learn the DBMS interface and to obey rules regarding data placement and access.

The direct file access facilities of computers generally provide only the following:

1. Creating and naming new files and renaming existing files, so that files may be accessed by name.
2. Adding one or more bytes of new data to the end of a file.
3. Truncating the length of a file, thereby losing the bytes beyond the new length.
4. Overwriting the values of bytes in an existing file with new values.
5. Copying extents of an existing file, beginning at a position, locatable as an offset from the start of the file, and continuing for a specified length, into another file by means of methods 1, 2, 3 and 4, above, and with the assistance of method 6, below.
6. Erasing existing file names and contents.

The above capabilities can be used in complex ways to alter files to achieve such purposes as overwriting of bytes at an existing position in the file, addition of bytes to the end of the file, and removal of bytes from a file (closing any gap caused by the removal). These actions can effect data storage and management under simple or complex file format schemes and they are in fact used in virtually all instances of data file management.

A programmer can use all of the file management capabilities listed above, but a suitable file format must be designed and data management routines implemented to suit the needs of a particular program. Since many of these needs are repetitive, standard solutions have been developed to address well-defined situations.

Well-known file formats that are suitable for the storage of loosely-structured data for the purpose of data transfer include SDF (system data format), which represents data units as ASCII strings terminated by linefeed characters; ANSI X.12 standard, which defines several layers of data units and sub-units by a system of in-stream specific-value separator bytes and type values which key to externally documented schemas; the telegraphy standard, which uses in-stream control values to describe the rough layout of data units within the stream; and the BASIC language convention of using comma-delimited ASCII data fields, generally in the context of a schema. In this category of file formats, emphasis is upon the containment and identification of data units independent of data management facilities; thus, access to data held in such formats remains a direct file access problem.

The mere separation and identification of data units is not sufficient for circumstances in which the use as well as the character of the data is well known. In such cases there is a need to combine file formats with behaviors specific to the structured data. The prior art attempts to accomplish this in formalized data management schemes.

Structured file access schemes that include limited data management capabilities are often employed to handle data intended for defined uses. Examples are graphic image files, which must be received, displayed and erased, but which rarely need to be indexed, filtered, or summarized. The file formats for graphic images, such as TIFF, PCX, and BMP, are generally acted on by code library procedures from any of numerous suppliers, and some or all of those procedures can be included in a program. Similar observations can be made about digital audio files, instrumentation data files, and any other files that have narrowly defined uses.

Highly structured file formats and sophisticated data management techniques have been developed in prior art. These schemes are categorized as Data Base Management Systems (DBMS). These systems are characterized by large program size and rigid record schemas (field layouts). Such systems do not satisfy the needs of programs that require irregular data file structures and simple file access. More advanced systems, categorized as Object-Oriented Data Base Management Systems (OODBMS) are even larger in size and generally slower in execution, but many of them allow data to be stored as objects with definable behaviors.

A data management facility is available under the commercial name KALA that occupies a conceptual space between the low level of direct file access and the high level of database schemes. KALA appears to be an object-oriented persistent file store facility that leaves much of the data organization to the programs that employ the product.

SUMMARY OF THE INVENTION

The present invention provides an object-oriented file structuring system for use on computers. The structured arrangement of information within a computer file is known as a file format. A computer file might exist only in computer memory, but its most common embodiment is in persistent storage on magnetic recording disks and tapes or on optical recording disks.

Objects in the present invention are encapsulations which associate data values with data type and identity with certain behaviors, and possibly with other information. A computer program designed to recognize an object can obtain from it at least one behavior (i.e., service), such as output of the enclosed data. It is the association of identity and behaviors with data that provides the basis for the term 'object-oriented'.

The present invention defines a file format that uses encapsulation and combines it with functionality necessary for the creation, use, modification and removal of different types of objects known as CONTAINER and DATA objects. The invention provides data management facilities for unstructured data, and it offers a suitable substrate for the development of object-oriented databases.

The invention permits object access by multiple threads of execution and object-by-object access control, and it includes file management capabilities such as file error detection and recovery, transactions, and journalling. The invention also allows any object to be annotated with a name and with comments.

The invention may be employed in several embodiments including, but not limited to, (1) a statically linkable code library, (2) a dynamically linkable code library, (3) a message-handling process, and (4) a device driver for storage media.

Notation and nomenclature are defined for building files, CONTAINER objects, and DATA objects, for defining relationships between and among files and objects and for addressing and describing objects.

A named and continuous sequence of information accessible to a computer, including a sequence of objects, is called a file. A computer file which is created and managed by the invention is called a MFILE. A MFILE consists of a HEAD, which is a CONTAINER object; it may have a TAIL which is a series of one or more objects of any type; and all of the file contents are constructed as objects that are demarked by consistently defined PREFIX and SUFFIX structures.

Computer programs that employ the invention place data values into DATA objects. A DATA object defined by the invention is a typed encapsulation of one or more typed values together with supporting information. The source of the values is defined by the programmer; it may be internal program data or external data gathered by the program as specified by the programmer.

The invention also provides for the creation of CONTAINER objects into which the program may place other CONTAINER objects and/or DATA objects. A CONTAINER object is a typed encapsulation of other CONTAINER objects and DATA objects, together with supporting information. A programmer who uses the invention determines which DATA objects and CONTAINER objects shall be placed within a given CONTAINER object. A CONTAINER object may enclose no objects, or it may enclose DATA objects, CONTAINER objects, or both.

There is also in the invention a SYSTEM object, which is not directly accessible to programmers. A SYSTEM object is an encapsulation of control information necessary to support internal file structuring and object management, and in the invention a SYSTEM object appears only in the tail of an MFILE or JOURNAL. The creation, maintenance and destruction of SYSTEM objects is automatically managed by the invention. In the present design SYSTEM objects do not exist within a CONTAINER, but there may be reason to allow this in a future improvement.

The PREFIX and SUFFIX structures of an object encode the object category (CONTAINER, SYSTEM, or DATA), the size of the object, and additional information appropriate to the category. Any object of each of the types identified in this paragraph, and all of their subtypes, can be type-identified from the PREFIX or SUFFIX structure of the object. The invention includes a facility for defining further sub-types of SYSTEM, CONTAINER and DATA categories.

Any object can be flagged in its brackets as holding Extended Information, which the present invention defines as a set of optional information such as that which pertains to identity, compression, encryption and presence of a checksum. The invention includes a facility for defining further categories of Extended Information items.

The PREFIX and SUFFIX structures are identical in content and similar in layout. For convenience, the term BRACKETS is used to refer to them as a pair. In one limited instance, the PREFIX and SUFFIX are merged into a single-byte TOKEN which represents an ABSENT DATA object.

The invention provides a facility called a 'HANDLE' which may be declared to exist in a program as the means for a program to access a given MFILE. The HANDLE always addresses an object. Upon creation, the HANDLE addresses a portion of the MFILE called the HEAD which is a CONTAINER object. From this position the HANDLE may NAVIGATE to CONTAINER and DATA objects contained within the HEAD or TAIL of the MFILE through use Of procedures which are called through the HANDLE.

An object which the HANDLE addresses at a given moment is said to be in FOCUS. Multiple HANDLEs may exist on a given MFILE at the same time, and they may have the same object or different current objects in FOCUS.

In computer memory the invention maintains a data structure called a FOCUS ENTRY, each instance of which references one object within an MFILE; any number of HANDLEs may then reference that FOCUS ENTRY as the means of having the referenced object in FOCUS. The FOCUS ENTRY stores a value known as a MAGIC STRING, which represents the current logical position of the object within the MFILE.

A FOCUS ENTRY is needed to support the current FOCUS of a HANDLE, to keep track of CONTAINER objects that enclose the current FOCUS of any HANDLE, to keep track of recent alterations to the MFILE, and for other purposes. Any HANDLE may reference a FOCUS ENTRY.

The invention maintains a list of all FOCUS ENTRIES needed at any given moment; this is called a FOCUS LIST. The FOCUS LIST is maintained in a sorted order, based on the MAGIC STRING values of FOCUS ENTRIES, and thereby it embodies the logical structure of the MFILE.

The FOCUS LIST is likely to have FOCUS ENTRIES representing objects in the HEAD and in the TAIL of the MFILE; as a HANDLE NAVIGATES among logically adjacent objects, it may successively reference objects which are physically separated and lie in the HEAD or in the TAIL in a physical order that differs from their logical order.

As described above, an MFILE is composed of two parts, denoted the HEAD and the TAIL. The HEAD is a CONTAINER object in which the physical location of objects is consistent with their relative logical order. The TAIL only exists at times when alterations have been made to the MFILE. The TAIL is comprised of SYSTEM objects and other objects which, taken together with the contents of the HEAD, represent the content and logical order of the MFILE. All MFILE alterations are made in the same time sequence as objects appended to the TAIL.

Periodically, the CONTAINER and DATA objects in the TAIL of a file are merged in logical order into the HEAD of the file, so that the HEAD comprises the entire MFILE. This process is called RECONSTITUTION. The deleted TAIL becomes part of a JOURNAL that minors all changes to the MFILE, unless the programmer elects not to maintain a JOURNAL on that MFILE. The JOURNAL can be used for roll-forward RECOVERY and roll-backward UNDO of file changes. The SYSTEM objects that were in the TAIL and which store information about logical file structure are saved in the JOURNAL but are not copied to the HEAD by RECONSTITUTION.

In the balance of this SUMMARY OF THE INVENTION, attention is turned to the BRACKETS (PREFIX/SUFFIX pair), the Object Control System and Data Management Support.

3. Brackets

Each object consists of a PREFIX BRACKET followed by object contents followed by a SUFFIX BRACKET. The PREFIX and SUFFIX encode their own sizes, the size of the object and object type information. Each BRACKET also has a parity bit, a flag to indicate whether the object serves testing purposes, and a flag to indicate whether Extended Information is present. Extended Information is a set of optional items including a checksum, a sequential number identifier, references to encryption and compression methods, a name, and other information that can characterize the contents.

To provide platform independence, all object BRACKETs are encoded as byte streams. Byte stream encoding is accomplished by having each PREFIX begin with a KEYBYTE and each SUFFIX end with an identical KEYBYTE. Because all computer systems can read one byte at a time, the KEYBYTE ensures that information about the byte stream can be obtained by the operating system of any platform.

The BRACKETs of an object are identical in size, and that size is encoded in identical KEYBYTEs that appear as the first and last bytes of the object. Each BRACKET encodes the offset at which the KEYBYTE of an adjacent object might be found: this offset is found in the PREFIX for 'next' objects and in the SUFFIX for 'prior' objects. The absolute values of these offsets are identical. Using this scheme, objects of varying size can be included in the file without reserving the space that would be required for fixed-length objects and without overloading the range of directly representable values in order to use a delimiting symbol.

Because the BRACKETs of an object encode the entire length of the object, a CONTAINER object holds the information necessary to bypass all of its contents, regardless of the direction of movement. This is important because CONTAINER objects can include multiple nested CONTAINED objects and multiple DATA objects, all of which can be bypassed in one movement. If there is any content within a CONTAINER, it begins immediately after the PREFIX of the CONTAINER; likewise, unless the CONTAINER is empty, some object ends immediately before the SUFFIX of the CONTAINER. If Extended Information is present, it is placed between the object PREFIX and any other contents.

Each BRACKET contains the object type, which is a specific binary numeric value that uniquely identifies that type. In the preferred embodiment, this information is present in a dedicated group of 6 bits in a byte known as the TYPE BYTE. In the preferred embodiment of a TOKEN, which is a DATA object by definition, five bits are used.

Because the purpose of an MFILE is to enclose data which comes in numerous shapes and sizes, the DATA object defined in the invention is available in commonly-used subtypes, such as INTEGER and STRING, each of which is uniquely identifiable by the numeric type value in the TYPE byte of the BRACKETS. The invention allows the future development of additional object types through use of numeric values in the TYPE byte which are not defined in this invention.

Within a DATA object the value encoding uses memory-based data storage sizes with data represented in the same format on all computers. For numeric values, this representation is canonical Most Significant Byte First (MSB) order, which provides platform independence with slight performance penalty on computers which do not use this byte order. For character and string values, the data is stored in 1, 2, or 4 bytes per character, depending upon the symbol mapping system in use. An index to the symbol mapping can be preserved in the DATA object itself or in any enclosing CONTAINER object. Other defined DATA types use similar value representations.

Any DATA object can be marked absent. Any absent DATA object can be represented either by a DATA object that has no enclosed storage space for a value or by a single-byte TOKEN that preserves the DATA typing information of the object.

The Object Control System

The invention controls access to an MFILE through the use of a HANDLE, which is a memory structure that references one object at a time. An arbitrary number of HANDLEs can be declared to exist in a program, each of which is open upon an MFILE and any number of which may be open on the same MFILE. At creation of a HANDLE, its focus is on the HEAD of an MFILE, which is itself a CONTAINER object.

In concept, a HANDLE navigates from object-to-object in an MFILE by jumping forward the distance encoded in the PREFIX of the current object for forward traversing or jumping backward the distance encoded in the SUFFIX of a current object for backward traversing. This concept holds true only for the ideal MFILE that has only a HEAD, because in that state all objects have the same physical and logical order. Because it is necessary for HANDLEs to be able to navigate at all times, however, the invention relies on indirect navigation by causing the HANDLE to reference FOCUS ENTRIES in the sorted order in which they appear in the FOCUS LIST. The invention creates from the physical file object a new FOCUS ENTRY whenever one is needed that is not present as part of the FOCUS LIST in memory. Programmers thus work with logical files and can freely create and modify the logical relationships of objects within the MFILE.

It is not necessary for the invention to create a FOCUS ENTRY for each object in the file, because a FOCUS ENTRY can be generated from a file object when needed. A FOCUS ENTRY does need to exist to support the current FOCUS of every HANDLE, and there are other needs as well, such as the need to reference objects recently removed from the file or recently added to the file.

The present invention causes each file to be altered only by additions to the tail of the file, so that the physical location of previously-added DATA is stable and thus easily accessible in a multi-threaded environment. Information is retained in the FOCUS LIST and in the TAIL of the MFILE to map the location of removed objects which have not yet been remove physically from the MFILE and to map the logical positioning of all objects added to the TAIL of the MFILE which are not yet in physical positions which match their logical positions. Placement of alterations at the end of the MFILE facilitates multi-thread multi-handle file access and allows multiple threads of execution to access, read, and modify various parts of a single file at the same time.

The FOCUS LIST tracks objects which are of interest to any open MFILE HANDLE and provides information about potential conflicts between HANDLEs. If two HANDLEs attempt to access the same object at the same time and conflict with each other, the system can continue without locking all other access to the rest of the MFILE; all other HANDLEs can continue modifying the file while the system deals with the individual conflict between the particular two conflicting HANDLEs.

The CURRENT FOCUS of a HANDLE is the point of reference for all information that can be obtained from an object and for all file ALTERATIONs, including TRANSACTIONs. While a HANDLE has an object in FOCUS, all information and values pertaining to the object can be obtained through the HANDLE without direct management of the MFILE by the programmer (although it is of course managed internally by the invention). Queries are available for object type, data value type, data element size and other descriptive information associated with the object, known as Extended Information items.

A DATA object within a CONTAINER is not accessible when a HANDLE has the CONTAINER in FOCUS; the HANDLE must first move its FOCUS into the CONTAINER and then move to the contained object. HANDLEs are the means of programmer access to the invention; they do not access SYSTEM objects which are created and used internally by the invention.

Alterations to an MFILE are made in reference to an object that is in CURRENT FOCUS. The available alterations are REMOVE, INSERT, REPLACE and APPEND. Any alteration other than REMOVE can take place as a FIXED TRANSACTION, and any alteration can take place within a WANDERING TRANSACTION. A TRANSACTION is a conditional series of alterations that must be resolved by COMMIT or ABANDON, and no part of a COMMITTED TRANSACTION will affect the file unless all parts of it affect the file.

Once the placement of an alteration has been established by the CURRENT FOCUS and the selected alteration, the action required to add an object in an alteration depends upon the alteration selected and type of object that is to be generated. The full sequence of actions to add a DATA object is ALTER, WRITE, COMMIT; the full sequence required to add a CONTAINER to the MFILE is ALTER, CREATE CONTAINER, COMMIT (in this example the added container will be empty). In these sequences the word ALTER stands for one of INSERT, REPLACE and APPEND. The general concept is that the placement of the alteration is announced in advance with reference to the current FOCUS. The concepts expressed by the action phrases given above may be embodied in differing function names without changing the invention.

Once generated an object has a TYPE defined at its generation, and thereafter it can be managed only as defined in the invention for objects of that TYPE. Thus, for example, data written as an INTEGER DATA object can only be read as an integer, and any attempt to read it as another DATA type will fail and any attempt to move into it (which a CONTAINER allows) will fail. Likewise, any attempt to read the value of a CONTAINER will fail, but movement into the CONTAINER will succeed.

While an object is in FOCUS, its value, type, and other supporting information can be obtained by invoking functions defined in the invention. The value of a DATA object is obtained by calling the READ function appropriate for that DATA type. All TYPE and Extended Information is obtained by QUERY functions.

An alteration is placed in reference to the current FOCUS of the HANDLE that performs the alteration. REMOVE always affects the object in current FOCUS, as does REPLACE. INSERT places the new object in the position prior to the current object, and APPEND places the new object in the position after the current object.

Alterations are accomplished by collecting the added or changed data in a buffer and then adding that buffer, together with information necessary to create the appropriate SYSTEM object, to an UPDATES QUEUE when a COMMIT occurs. Similarly, the REMOVE action causes only the information necessary to create the appropriate SYSTEM object to be added to the UPDATES QUEUE. The purpose of the SYSTEM object is to carry essential information regarding the kind of alteration and the logical placement of that alteration in the MFILE.

Once objects have been removed from the MFILE or added to the MFILE, its physical configuration no longer conforms to its logical configuration. For example, a new object on the TAIL will be logically placed within a CONTAINER inside the HEAD. Similarly, added objects may appear in the TAIL in an order that is dissimilar to their intended logical order. SYSTEM objects associated with DATA and CONTAINER objects in the TAIL retain the needed logical references, but they are duplicative of information maintained in the FOCUS LIST and are only used if needed to reconstruct the FOCUS LIST in case of an unexpected computer process interruption.

Periodically, a RECONSTITUTION algorithm is executed (without user intervention) to update the physical file so that it will correspond to the logical file. The RECONSTITUTION algorithm briefly halts alterations to the file to create a copy of the FOCUS LIST for updating. A reconstituted version of the file is created (on an optional separate thread of execution) in which the physical and logical arrangement of objects is consistent. This reconstituted file replaces the original, unreconstituted file. If the RECONSTITUTION process takes place on a separate thread of execution, alterations can continue to occur to the original file. At the last step of RECONSTITUTION, these alterations are added to the tail of the reconstituted file. In such a case, file access is not compromised during the RECONSTITUTION process.

Data Management Support

The invention provides TRANSACTION controls to assure that a defined set of MFILE alterations will be atomic, which means that an alteration made as part of a TRANSACTION will not affect the file unless all alterations which are part of the same transaction reach the file. Two variants of this concept are presented by the invention: FIXED TRANSACTIONs allow multiple alterations that can be added to the file at a single location; and WANDERING TRANSACTIONs allow multiple alterations at multiple locations within the file.

The invention also provides means of identifying and isolating corrupted areas of an MFILE. Because the length of each object is encoded in its PREFIX and SUFFIX, physical corruption which alters the actual or indicated length of file objects is easily detected. Furthermore, each PREFIX and SUFFIX contains a parity bit which is used to assist the detection of corruption of one or both of the BRACKETS. In addition, an optional checksum may be recorded with any object to validate its contents.

The present invention will automatically detect a corrupt area in an MFILE whenever an attempt is made to navigate to or into a corrupted object. The invention maps the range of the corruption, marks it as a BAD OBJECT, and copies it to an errorfile. The BAD OBJECT can be reached by a HANDLE performing a navigation move, but it can only be replaced or removed. The error file may contain recoverable objects which can be identified by matching PREFIX and SUFFIX structures. It is possible to develop sophisticated data recovery utilities based on this object design.

At the programmer's option, a JOURNAL is provided to match every MFILE, from which the MFILE can be reconstructed and from which alterations can be reversed in a series of 'undo' steps. The structure of the JOURNAL is basically that of the MFILE with only a TAIL or with a TAIL that is never merged into the HEAD by RECONSTITUTION; the structure depends upon the user's choice of styles for retention of file backups.

The JOURNAL can be used together with a base file (a copy of an earlier version of the MFILE) to reconstruct the MFILE in case of a computer malfunction. Similarly, the TAIL of an MFILE is used to reconstitute an MFILE in the event of a computer malfunction.

BRIEF DESCRIPTION OF THE DRAWINGS

FIG. 1 illustrates an example of a computer system.

FIG. 2 illustrates a TYPE byte of the present invention.

FIG. 3A illustrates an object of the present invention.

FIG. 3B illustrates the body of an object of the present invention.

FIGS. 4A and 4B illustrate detailed views of a PREFIX and a SUFFIX, respectively.

FIG. 4C illustrates the content of a DATA object.

FIG. 4D illustrates the content of a CONTAINER object.

FIGS. 5A-5C illustrate the creation of a logical file structure.

FIGS. 6A and 6B illustrate a flow diagram illustrating the RECONSTITUTION process.

FIG. 7 is a flow diagram illustrating step 602 of FIG. 6A.

FIGS. 10A-10C illustrate the state of the physical file stored in memory during the creation and manipulation of the logical file of FIGS. 5A-5C.

FIG. 11 illustrates a focus list of the present invention.

FIG. 12 illustrates a file formatted in accord with the present invention.

FIG. 13 illustrates the format of the entries in the focus list.

FIGS. 14A through 14G illustrate the layout of the Extended Information structure.

FIG. 15A illustrates the content of a SYSTEM object.

FIG. 15B illustrates the commands of a SYSTEM object.

FIG. 17A illustrates a file composed of objects.

FIG. 17B illustrates two HANDLES having FOCUS on objects in the FIG. 17A file.

DETAILED DESCRIPTION OF THE INVENTION

Figure 9B:
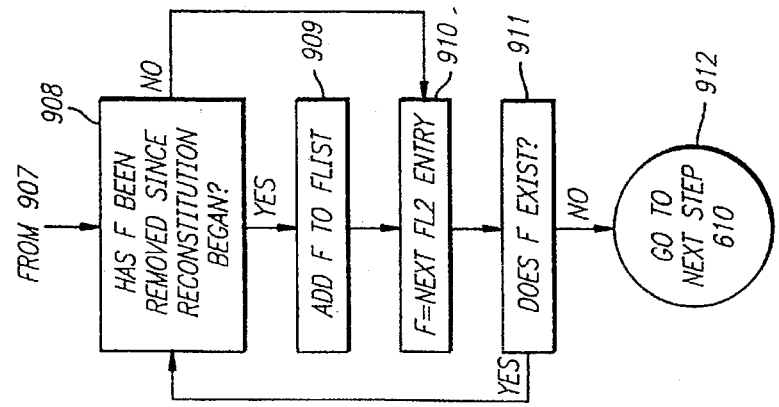
FIGS. 9A and 9B are a flow diagram illustrating step 609 of FIG. 6B.

A method and apparatus for providing an object oriented file structuring system is described. In the following description, numerous specific details, such as operating system, PREFIX and SUFFIX sizes, etc., are set forth in detail in order to provide a more thorough description of the invention. It will be apparent, however, to one skilled in the art, that the present invention may be practiced without these specific details. In other instances, well known features have not been described in detail so as not to obscure the present invention.

A. Concepts of File and Object.

The present invention provides a method and apparatus for access to the contents of files at logical positions, rather than physical positions.

A computer file is a continuous and uninterrupted sequence of bytes identified by a starting position that has an extent (a continuous length), generally all of which is accessible to the computer. In most implementations, the file is also identifiable by a name. A byte is a unit of data which can be manipulated atomically (all at once) by the central processing unit (cpu) of a computer. In most computers, a byte consists of eight bits of binary information. Each bit holds a value of 0 or 1. The content of a file may consist of instructions to the cpu, or data, or an admixture of instructions and data.

In the present invention, files are considered as embodiments of data that may include executable programs and executable routines as components of the file. Computer files are generally stored on persistent media, such as magnetic disks, but they must be copied into computer memory to become directly accessible to the cpu; this copying is ordinarily performed by facilities provided by computer operating systems.

The organization of components of a file is generally known as a file structure. There are no requirements for the structuring of files other than the requirements set by a programmer or by a standard which the programmer wishes to follow. There are numerous file structure standards in common use. The present invention differs from known file structures.

Computer files defined by the present invention are characterized by a consistent paradigm: each file consists of a HEAD part followed by a TAIL part, and the TAIL part is a temporary appendage that is merged periodically into the HEAD. Files defined by the invention contain objects that are also defined by the invention, and data held in the file is located within specific objects. The HEAD of the file is an object, and the TAIL consists of one or more objects when it exists. A computer file of the structure and content defined by the present invention is referred to as an MFILE.

An object appears to a computer as a structure of information accessible in memory that possesses type and is associated by type with defined behaviors which are implemented by the computer. Thus, information cannot exist as an object without association of its type with one or more computer-executable routines which may use the information (besides type) held in the object; this association is provided by an executable program which is designed to recognize the structure and type of the object and to access the information held within an instance of that structure. An object also has identity, which may be simply its unique position within the file or may be a unique numeric identifier assigned at its creation.

A computer program may be uniquely designed to manage objects, or it may incorporate within itself access to pre-defined executable code or executable processes that manage objects. The present invention provides a pre-defined facility that can be used by or incorporated into other computer programs to provide object management, including those behaviors which have been defined in the invention for each type of object.

Objects defined by the invention have a precisely-defined structure that is characterized by BRACKETing of the beginning and the end of the object. The BRACKETs are self-defining structures that encapsulate type, contents and other information. The objects of the present invention fall into three general categories: DATA objects, CONTAINER objects, and SYSTEM objects, each of which is delimited by BRACKETs consisting of a PREFIX and a SUFFIX. A DATA object holds zero or more typed values; a CONTAINER object encloses zero or more DATA objects and zero or more other CONTAINER objects. SYSTEM objects hold control information necessary to keep track of the logical organization of the file and of modifications to the file.

B. Symbolic Notation.

The BRACKETs that encapsulate objects of the invention appear as the following symbols in the preferred embodiment of documentation of the invention:

{ CONTAINER object PREFIX
} CONTAINER object SUFFIX
[ DATA object PREFIX
] DATA object SUFFIX
< SYSTEM object PREFIX
> SYSTEM object SUFFIX The BRACKETs {}, [] and <> are referred to jointly as BRACKETS in the present invention. There is no significance in this notation to the spacing between a PREFIX symbol and a SUFFIX symbol of an object, or between the SUFFIX symbol for one object and the PREFIX symbol for another object, or between the PREFIX symbol of a CONTAINER and the PREFIX symbol for a contained object. For example, {}[] and { } [ ] mean the same thing.

The smallest file that can be represented in the preferred embodiment of present invention is designated as { }. This is a CONTAINER object that holds no objects within it. Any CONTAINER object can hold any number of CONTAINER objects and any number of DATA objects, including none at all. Consider for example, the following example:

{{}[][]}

The above is a symbolic representation of a file. The outermost BRACKETs "{ }" are themselves the extremes of a CONTAINER that contains one empty CONTAINER (first enclosed pair of BRACKETs "{ }") and two DATA objects (the second and third enclosed pairs of BRACKETs "[ ]").

In the preferred embodiment, the symbolic notation is expressed in "levels" to represent nesting of CONTAINERs, one inside another. However, the levels are not required. The following is the same example, showing a CONTAINER object and two DATA objects nested inside another CONTAINER:

```
{          }
 { } [ ] [ ]
```

The number and levels of objects of the preceding example can be expanded by adding objects to the empty CONTAINER object. First, we rewrite the above example with reference numbers for the CONTAINERs and DATA objects (note that the numbers inside the brackets represent the logical positions of the objects, not any information actually stored within):

```
{0                 }
 {0.1} [0.2] [0.3]
```

Next add a DATA object 0.1.1 and a CONTAINER object 0.1.2 to CONTAINER object 0.1. Also add one CONTAINER object 0.1.2.1 to CONTAINER object 0.1.2 as follows:

```
{0                              }
 {0.1             } [0.2] [0.3]
  [0.1.1]{0.1.2    }  <- added objects
          [0.1.2.1]   <- added object
```

Note that the highest level object is the HEAD of the MFILE itself, which always exists. Because this level always exists, it can be implied, so representing it is optional.

The foregoing examples represent the logical structures of files. Due to characteristics of the invention that are explained later, the alteration of a file results in a temporary physical state that differs from the logical state, because all added objects and all information about alterations of MFILE logical structure are appended to the TAIL of the MFILE. The temporary physical state for the preceding example may be represented symbolically as follows (assuming that all of the added objects became part of the MFILE before the temporary state ended):

```
=====HEAD=====------------------TAIL--------------------
{0           }<0.1.1>[0.1.1]<0.1.2>{0.1.2}<0.1.2.1>[0.1.2.1]
   {0.1}[0.2][0.3]
```

Note that in this representation each added object is preceded by a SYSTEM object that provides logical placement information. The SYSTEM objects are no longer needed after the objects that were temporarily added to the end of the MFILE have been placed in physical positions that accord with their logical positions.

C. File Structure.

An MFILE consists of objects, arranged in structural components of the file called the HEAD and the TAIL. The HEAD of the file is a CONTAINER object, and the TAIL of a file is a sequence of objects of SYSTEM, CONTAINER and DATA types.

Within the HEAD objects have physical locations that are consistent with their relative logical locations. Thus, contained objects are located between the PREFIX and SUFFIX of their container, and adjacent objects are described as PRIOR to or NEXT to one another. An exception exists for a removed object, which temporarily exists in the HEAD but which is the subject of a SYSTEM object in the TAIL that represents the adjustment of logical positions that results from the removal. Another exception exists for added objects, which temporarily are placed in the TAIL but which hold logical positions within the HEAD.

The TAIL exists for the purpose of allowing all file alterations to be appended to the end of the file in the sequence in which the alterations occur, regardless of the logical position that the object is intended to assume. A SYSTEM object exists to retain information about the alteration and the logical positions affected by the alteration. If the alteration consists of removal of an object, the alteration is represented on the TAIL by a SYSTEM object only. If the alteration is additive, which includes replacement of an object, the SYSTEM object is followed on the TAIL by all objects that were added to the MFILE in the same alteration.

D. Object Structure.

The general structure of an object is illustrated in FIG. 3A: each object consists of a PREFIX 301 followed by a BODY 302 followed by a SUFFIX 303. The internal structure of the BODY is illustrated in FIG. 3B. Adjacent to the PREFIX 301 there is an optional Extended Information structure 304, followed by the object CONTENT 305 and the SUFFIX 303. In the case of a DATA object, zero or more typed values occupy the CONTENT 305. In the case of a CONTAINER object, zero or more objects occupy the CONTENT 305. For a SYSTEM object (referring now to FIG. 15A), the PREFIX 301 is followed by a COMMAND 1502, a VIRTUAL FILE POSITION 1503, a REFERENCE OBJECT MAGIC STRING 1504, and the SUFFIX 303.

FIGS. 4A and 4B illustrate the general internal structure of BRACKETS. FIG. 4A shows a PREFIX which begins with a KEYBYTE 401P, followed by the PREFIX REMAINDER 402P and the object BODY 302. FIG. 4B shows a SUFFIX which begins with the object BODY 302, followed by the SUFFIX REMAINDER 402S and the KEYBYTE 401S. The functionality of these components and the bit patterns used in their preferred embodiment are discussed below.

E. Container Objects.

The purpose of CONTAINER objects is to enclose zero or more other objects of any type. CONTAINER objects may enclose other objects of any kind, except that in the current implementation of the invention SYSTEM objects never appear within a CONTAINER. The CONTAINER object type is shown in FIG. 2 as defined in the TYPE byte of BRACKETS in the preferred implementation. The general layout of the contents of a CONTAINER object is illustrated in FIG. 4D, in which any number of contained objects 405 and 407 constitute the CONTENT 305 of the CONTAINER object. Note that it is permissible for a CONTAINER object to be empty, in which case the CONTENT 305 will be missing but all other parts of the object will be present.

Files of the preferred embodiment include a top level CONTAINER. The SUFFIX of the top level CONTAINER marks the end boundary of a reconstituted file. Any part of the file that has been reconstituted is necessarily within the top level CONTAINER, known as the HEAD. Therefore, the location of the beginning of the TAIL of a file is easy to determine.

F. Data Objects.

DATA objects hold zero or more data values, as defined by their respective sub-TYPES. If no data value is present, the object is marked ABSENT but all other components of the object exist in the file. The DATA object type is shown in FIG. 2 as defined in the TYPE byte of BRACKETS in the preferred implementation. FIG. 4C illustrates the presence of a DATA VALUE 403 (which may be multiple, such as an array or structure) as the DATA object CONTENT 305.

Certain DATA objects can contain defined supplementary typing information. CHAR and STRING can store foreign-language symbols, such as Chinese ideograms, coded according to the Extended ASCII or Unicode standards. In the preferred embodiment, an index to the symbol map in use is stored in the MAP element of the Extended Information Structure, with ASCII standard mapping assumed in the absence of a MAP value. Any CONTAINER may contain the same symbol map information, in which case the symbol map for all contained CHAR and STRING objects is defined by the CONTAINER unless an intermediate container or the CHAR or STRING object itself overrides that default definition. The MAP element is discussed below.

In the preferred embodiment, a DATA object holds one data value or data set per object. In alternate embodiments, multiple data values and/or data sets may be held. Instances of data sets are arrays, structures of typed elements, sequences, unions, and fundamental data structures of any type. The present invention defines single-value elementary TYPEs, such as INTEGER and STRING, but the invention comprehends the extension of the typing system to complex data types. The defining characteristic of object types is that the TYPE is embedded in the object when the object is created and that the TYPE can be ascertained by implementations of the invention that will always associate the same defined behaviors with that TYPE.

For those types that are often discriminated by storage size, such as short and long integer, the distinction is preserved by virtue of the fact that the data storage representation occupies the same number of bytes as it did on the computer where it was first generated.

The INTEGER type can contain a signed integer value that is limited in range only by the storage defined for it on the computer platform where it was first generated. If the storage required for the value is too large for a different platform, an error is generated when an attempt is made to read it.

Similarly, the UNSIGNED INTEGER type can contain an unsigned integer value that is limited in range only by the storage defined for it on the computer platform where it was first generated. If the storage required for the value is too large for a different platform, an error is generated when an attempt is made to read it, and the value remains unaccessible.

The FLOAT type can contain a floating point value that is limited in range only by the storage defined for it on the computer platform where it was first generated. It can hold float, double and long double values in the format defined by IEEE Standard 754-1985, promulgated by The Institute of Electrical and Electronics Engineers. If the storage required is too large for a different platform, an error is generated when an attempt is made to read it.

In the preferred embodiment, the representation or INTEGER, UNSIGNED INTEGER, and FLOAT is in canonical MSB (Most Significant Byte) two's complement binary format.

The CHAR type can hold 1, 2, or 4 byte storage that represents a single symbol in a defined symbol set. The default symbol set used in the preferred embodiment of the invention is Extended ASCII, but any symbol map of the UNICODE standard can be indicated in the MAP element of the Extended Information structure of the CHAR object or of any CONTAINER holding the CHAR object, in which case the identified symbol map is identified for use by the calling code. When a CHAR object is read the value is retrieved into a byte array variable in computer memory, where the byte array is of the appropriate storage size.

The STRING type can hold any length string that can be BRACKETed within an object. The string is represented as an array of 1,2, or 4 byte values that equate to a symbol set. The default symbol set used in the preferred embodiment of the invention is Extended ASCII, but any symbol map of the UNICODE standard can be indicated in the MAP element of the Extended Information structure of the STRING object or of any CONTAINER holding the STRING object, in which case the identified symbol map is identified for use by the calling code. When a STRING object is read, the value is retrieved into an array of variables of the size used to store the character components of the STRING object.

The BOOLEAN type holds TRUE or FALSE as a value, which is represented as a non-zero integer for TRUE and as zero for FALSE. Any signed integer may be written to BOOLEAN, but the value retrieved into an integer variable by reading the object will be zero or one.

The BINARY type is used to enclose data that is anonymous to the typing system of the invention. The invention does not alter the presentation of this data value, even when the platform of origin differs from the platform on which the data is to be read. The value is retrieved into a buffer of the required length, which can be obtained from the BINARY object by QUERY.

The ENUMERATION type is used to store signed integer values of a defined set. The representation is the same as INTEGER, but the difference of TYPE identifies the value as one which may have storage characteristics that differ from that of INTEGER on various machines.

G. Non-Value Data Objects.

There are mutually-exclusive cases of DATA objects that have no values, per se. In the present invention, five of these cases are specifically encapsulated in objects. The 'absent' special case is represented by a TOKEN or a DATA object with no space for storage. The other special cases are defined as a dependency of TYPE and are represented in the TYPE MAP element of Extended Information within an object. The following special cases have been defined (others are possible):

| | |
|---|---|
| absent DATA | for all TYPEs |
| positive infinity | for numeric TYPEs |
| negative infinity | for numeric TYPEs except UINT |
| not a number | for numeric TYPEs |
| null | for STRING, BITSTREAM, FILE |

The "absent DATA" case is especially useful where data is stored in a defined structure holding defined fields and where data is collected from an input stream. Many data storage implementations make no distinction between a numeric value of zero and an uninitiated numeric field, or between an empty string field and a string field that has not been initiated. This condition makes it difficult to identify incomplete or missing objects. The present invention, by contrast, can denote any typed object as ABSENT, thereby denoting that it was not initialized with a value when an object of that TYPE bearing a value was expected. ABSENT is indicated without limiting or overloading the representable DATA value range, and it preserves the DATA TYPE of the missing data.

The "infinity" special cases represent instances in which a numeric type is needed, but no numeric value would properly represent "infinity."

The "not a number" case (which mathematicians denote as NaN) exists when a numeric value is expected but the submitted value does not make sense: examples are infinity divided by infinity or zero divided by zero.

The "null" special case represents an empty string. In a "C" or "C++" language binding, a zero CHAR could represent an empty string, and this is in fact allowable in the invention. Other languages, however, manage string definition differently (PASCAL, for example, prefaces a string with a length indicator). The "null" special case provides a common standard that allows consistent storage of strings, regardless of the computer language in use. NULL is indicated without limiting or overloading the representable DATA value range.

H. System Objects.

SYSTEM objects provide the means by which the present invention stores the information that is essential to allow correct reconstruction of an MFILE in the event of unexpected interruption of a computer program which employs the invention. The SYSTEM object stores much the same information that is retained in a FOCUS ENTRY, described later. The FOCUS ENTRY resides in computer memory and is used as the information source for periodic reorganization of the MFILE so that the physical object structure of the MFILE embodies its logical object structure. In the event of program interruption, however, the FOCUS ENTRY is lost; in this case the SYSTEM objects in the TAIL are used to rebuild needed FOCUS ENTRIES so that the MFILE can be appropriately reconstructed.

The SYSTEM object appears in the TAIL of an MFILE, where it precedes each object added to the MFILE. The SYSTEM object stands alone in the instance where it is used to indicate the removal of an object from the MFILE, and it stands in conjunction with one or more added objects where it is used to indicate the presence of an additive alteration to the MFILE. The SYSTEM object is eliminated by the process, known as RECONSTITUTION, which restructures the MFILE so that the physical structure embodies the logical structure.

The SYSTEM object holds somewhat different information from that held in its matching FOCUS ENTRY, for two reasons: first, the FOCUS ENTRY serves additional purposes relating to object management by HANDLES; second, the FOCUS ENTRY stores an updatable logical position marker, whereas the logical position information held in the SYSTEM object on the TAIL of the file cannot be updated in any efficient way. This second difference requires further explanation.

The SYSTEM object retains information about the physical position that should be occupied by the object which it accompanies. This information is also often out-of-date, but the shortfall in information is made up by the sequencing of the SYSTEM objects on the TAIL of the file and the placement of the physical object location information into the recreated FOCUS ENTRY, where it can be updated as further changes occur.

The structure of the SYSTEM object is shown in FIG. 15A. The SYSTEM object consists of prefix 301 and suffix 302 bracketing a command 1502, virtual file position 1503, and reference object Magic String 1504. The command 1502 contains one of the choices listed in FIG. 15B. The Virtual File Position 1503 provides the necessary physical object location. The Reference Object Magic String 1504 provides the necessary logical object location.

FIG. 15A shows the structure of a SYSTEM object. The Command field indicates the kind of file alteration. The available alterations are here set forth in conjunction with the numerical values and purposes assigned to them in the preferred embodiment:

1. Insert—place following object(s) before reference object.
2. Append—place following object(s) after reference object.
3. Replace—replace reference object with following object(s).
4. Remove—remove the reference object from the file.
5. BeginT—note the beginning of a transaction.
6. EndT—note the end of a transaction.
7. AppendPrefirst—place following object(s) first in container.
8. InsertPostlast—place following object(s) last in container.

The 'Virtual File Position' 1503 in FIG. 15A stores an unsigned long integer that indicates the physical file position at which the following object should begin if none of the preceding alterations in the TAIL of the file had taken place. This information is obtained from the FOCUS LIST when the alteration is COMMITTED, as described below in the section on the Object Control Scheme.

The 'Reference Object Magic String' 1504 in FIG. 15A is a variable-length numeric sequence formatted like a numeric Dewey Decimal number, which represents the logical position of the reference object in the file. The section above on Symbolic Notation uses a printable representation of this value to indicate the logical positions of objects in the diagrams shown. The actual encoding of the 'Magic String' is explained below in the section on the Object Control Scheme. The 'Magic String' for the Reference Object is obtained from the FOCUS ENTRY for the current FOCUS when a HANDLE COMMITs an alteration.

The sequentially-appended SYSTEM objects preserve a copy of the MAGIC STRING of the reference object that was held in FOCUS by a HANDLE when the HANDLE made the change. Thus, if the SYSTEM objects are needed to reconstruct the FOCUS LIST that contains the FOCUS ENTRIES, each SYSTEM OBJECT can refer to an already-recreated FOCUS ENTRY that can be located by its unique MAGIC STRING in the FOCUS LIST, and the subsequent updating of the FOCUS ENTRY logical position by other file alterations can thereafter occur in memory.

I. Brackets and Token.

The defining characteristics of objects in the invention are that they are self-descriptive with respect to object size and type and that this self-descriptive quality is present in PREFIX and SUFFIX BRACKETs that comprise the beginning and end of each object in a byte stream. This level of generality allows object types to be defined for objects which can enclose virtually any kind and size of information, including other objects, and it provides a robust foundation for assuring object integrity.

An example of the format of an object is illustrated in FIG. 3A. An object is comprised of a PREFIX 301, BODY 302, and a SUFFIX 303. The PREFIX and SUFFIX are referred to individually as BRACKET and jointly as BRACKETS. The BRACKETS have closely similar structures and incorporate identical information.

The information necessarily incorporated by a BRACKET falls into the following categories: (1) BRACKET size, (2) object length, and (3) object type. The invention also provides (4) a parity bit, which is useful in checking object integrity, (5) a flag that indicates whether Extended Information is present within the object, and (6) a flag that indicates whether the object is operational or is a test object.

The invention comprehends the encoding within each bracket of either the actual object length or the offset to the opposing BRACKET. The opposing BRACKET can be located by various offsets, the most obvious ones being to the first or last bytes of that BRACKET, but the preferred offset to locate the opposing BRACKET is to the position of its KEYBYTE. The difference between the KEYBYTE offset and the length of the object is 1 byte, so that the adjustment is easily made to jump to the next adjacent object rather than to the opposing BRACKET. The description of the present invention expressed in this document is given in terms of encoding the full length of the object, which is the preferred embodiment.

The PREFIX 301 and SUFFIX 303 contain the same information and identify the length of the object encapsulated by the BRACKETS. That is, identical absolute object length values are encoded in the PREFIX 301 and SUFFIX 303. This makes it possible to jump forward to immediately past the end of an object by reading the PREFIX, or to jump backward immediately before the beginning of an object by reading the SUFFIX.

Each object ends with a SUFFIX KEYBYTE so that the SUFFIX KEYBYTE can be adjacent to the PREFIX KEYBYTE of any succeeding adjacent object. Similarly, each object begins with a PREFIX KEYBYTE so that the PREFIX KEYBYTE can be adjacent to the SUFFIX KEYBYTE of any preceding adjacent object.

The rule that KEYBYTEs of physically adjacent objects are themselves adjacent is subject to exception in the cases of a CONTAINER object and the first and last contained objects. As shown in FIG. 4D, the PREFIX KEYBYTE of the first contained object 405 lies immediately after the PREFIX 404 of the CONTAINER 403, and the SUFFIX KEYBYTE of the last contained object 407 lies immediately before the SUFFIX 405 of the CONTAINER.

In the preferred embodiment, each BRACKET of an object holds four categories of information: BRACKET size, object length, object type, and BRACKET parity. In other embodiments, different numbers and kinds of categories of information may be held by a Bracket. In addition, extended information falling into several categories mentioned above is present in the BRACKETS if so indicated in each BRACKET. The order of information differs between PREFIX and SUFFIX, but the substance of the information is identical. The preferred embodiment is given below.

The first and last bytes of an object are the KEYBYTEs of the object's BRACKETS. Each KEYBYTE provides information that is essential to the self-description of the object. In an extreme case in which a DATA object is ABSENT, the first and last bytes are merged into a single-byte TOKEN.

A BRACKET can vary in size from one byte to six bytes in the preferred embodiment. As a general principle, the larger BRACKET sizes are required in order to include sufficient bits to encode larger object lengths, as illustrated in the preferred embodiments shown for PREFIX and SUFFIX, below. Note that there is no inherent limit to the size of the PREFIX or SUFFIX.

Each BRACKET contains TYPE information, which generally identifies an object as CONTAINER, DATA or SYSTEM, but also provides further detail for sub-categories of object TYPE. A TOKEN, which is a combined SUFFIX/PREFIX of one byte in length, is by definition a DATA object, so it contains only the 5 bits necessary to identify the TYPE subcategories of DATA. All other BRACKETs include a separate TYPE byte, so the smallest non-TOKEN BRACKET is two bytes in length.

Each BRACKET indicates whether Extended Information is present. FIGS. 3A and 3B illustrate the placement of the optional Extended Information structure. The BODY 302 of an object is decomposed in FIG. 3B, wherein the optional Extended Information structure 304 is shown to precede the CONTENT 305. The Extended Information structure holds information that characterizes the object.

Although the KEYBYTE is part of a BRACKET, its structure is described in advance of that of the overall BRACKET as an aid to understanding. The reason for this is that a BRACKET is not defined as having a fixed size and the KEYBYTE holds the essential BRACKET size information.

FIGS. 3A and 4A illustrate the composition of a PREFIX 301, in which the KEYBYTE 401P is followed by the PREFIX REMAINDER 402P and then by the object BODY 302. FIGS. 3A and 4B illustrate the composition of a SUFFIX 303, in which the object BODY is succeeded by the SUFFIX REMAINDER 402S and then by the KEYBYTE 401S.

The KEYBYTE describes the size of the BRACKET of which it is a part (the only part in the case of a TOKEN). From the length of the BRACKET it is possible to ascertain the size and the location of the rest of the BRACKET: for PREFIX BRACKETs the KEYBYTE is the first byte, and for SUFFIX BRACKETs the KEYBYTE is the last byte.

Computer systems and platforms that use the file system of the present invention are capable of reading a single byte at one time. Jumps between adjacent objects within a CONTAINER thus become one-byte jumps forward from the SUFFIX key byte of one object to the PREFIX key byte of the next object, or one-byte jumps backward from the PREFIX key byte of an object to the SUFFIX key-byte of the preceding object. This illustrates why the internal byte-orderings of PREFIX and SUFFIX order are not identical, although the PREFIX and SUFFIX contents are identical.

Each KEYBYTE also includes a parity bit, which is set to match the parity of the other bits in the BRACKET. The presence of this parity bit facilitates the detection of corruption in the BRACKET itself and in the entire object.

In the preferred embodiment, the size encoding of a KEYBYTE is represented by a bitstream of '1' value bits, terminated by a '0' value bit. The bitstream could proceed from Most Significant Bit downward or from Least Significant Bit upward; in the preferred embodiment the latter method is used. The position in which a '0' bit value is first encountered (counting from 1 upwards) represents the number of bytes in the BRACKET, including the KEYBYTE.

This scheme may be represented by '0' and '1' values for bits that are meaningful and 'x' values for bits that are not considered. Thus, in a TOKEN the Least Significant Bit (which is in position 0) holds a '0' value in the sequence 'xxxxxxx0', indicating that the BRACKET is 1 byte in length. In a two-byte BRACKET the Least Significant Bit holds a '1' value and the next most significant bit holds a '0' value which terminates a two-bit sequence of 'xxxxxx01', where 'x' represents bits that are not considered. Likewise, in a three-byte BRACKET the three-bit sequence is 'xxxxx011'. Note that in this representation the bit positions are represented as 76543210, with 0 as the Least Significant Bit position.

In concept, the KEYBYTE need not contain any information other than BRACKET size, because the balance of the BRACKET can be encoded to contain all other essential information, such as object length and object TYPE. In the preferred embodiment, however, it has proven convenient to employ for other purposes the bits that are unused for size encoding.

The preferred embodiments of BRACKETS are set forth below for PREFIX and SUFFIX. Note that the TOKEN representation appears identically as the 1-byte size BRACKET for PREFIX and SUFFIX. For the purpose of representing bit-level encoding of BRACKETS, the following symbols are used:

'P' is a parity bit

'E' is an extended information presence bit

'X' is a test object indicator bit

'T' is an object type encoding bit

'L' is a object length encoding bit

'S' is a BRACKET size encoding bit

Bit positions are represented in the order of 76543210, with position 0 being the Least Significant Bit.

The KEYBYTE of a BRACKET has already been described. The structures of the remaining components are now described under the categories of prefix, suffix, token and extensions, which differ from one another.

A detailed view of the PREFIX is illustrated in FIG. 4A. The PREFIX 301 consists of a KEYBYTE 401P followed by the PREFIX remainder 402P. The PREFIX KEYBYTE 401P identifies the length of the PREFIX 301 and correspondingly, the length of the PREFIX remainder 402P.

A representation of PREFIX structures from one byte to six bytes in length is illustrated in Table 1 below:

TABLE 1

Layout of a PREFIX (KEYBYTE is the leftmost byte):

| | |
|---|---|
| 1-byte | PTTTTTXS |
| 2-byte | PLLLLLSS TTTTTTXE |
| 3-byte | PLLLLSSS LLLLLLLL TTTTTTXE |
| 4-byte | PLLLSSSS LLLLLLLL LLLLLLLL TTTTTTXE |
| 5-byte | PLLSSSSS LLLLLLLL LLLLLLLL LLLLLLLL TTTTTTXE |
| 6-byte | PLSSSSSS LLLLLLLL LLLLLLLL LLLLLLLL LLLLLLLL TTTTTTXE |

As shown above, in a two byte PREFIX, the 'L' bits in bit positions 6, 5, 4, 3, and 2 of the KEYBYTE indicate the length of the object (i.e. the offset to the next object). A two byte PREFIX is used to represent an object up to 31 bytes in length. A three byte PREFIX uses bit positions 6, 5, 4, and 3 of the KEYBYTE, and one length byte, to indicate object length. A three byte PREFIX is used to represent an object up to 4095 bytes in length. A four byte PREFIX has three length bits in the KEYBYTE and two length bytes, and is used to represent an object up to 524,287 bytes in length. A five byte PREFIX has two length bits in the KEYBYTE and three length bytes, and is used to represent an object up to 67,108,863 bytes in length. A six byte PREFIX has one length bit in the KEYBYTE and four length bytes, and is used to represent an object up to 8,589,934,589 bytes (approximately 8 gigabytes) in length. These BRACKETS are the preferred embodiment, but the invention comprehends the possibility of representing even larger objects with yet largest BRACKETS.

A detailed view of the SUFFIX is illustrated in FIG. 4B. The SUFFIX 303 consists of a KEYBYTE 401S preceded by the SUFFIX remainder 402S. The SUFFIX KEYBYTE 401S identifies the length of the SUFFIX 303 and correspondingly, the length of the SUFFIX remainder 402S.

A representation of SUFFIX structures from one byte to six bytes in length is illustrated in Table 1 below:

TABLE 2

Layout of a SUFFIX (KEYBYTE is the rightmost byte):

| | |
|---|---|
| 1-byte | PTTTTTXS |
| 2-byte | TTTTTTXE PLLLLLSS |
| 3-byte | TTTTTTXE LLLLLLLL PLLLLSSS |
| 4-byte | TTTTTTXE LLLLLLLL LLLLLLLL PLLLSSSS |
| 5-byte | TTTTTTXE LLLLLLLL LLLLLLLL LLLLLLLL PLLSSSSS |
| 6-byte | TTTTTTXE LLLLLLLL LLLLLLLL LLLLLLLL LLLLLLLL PLSSSSSS |

The object lengths which can be encoded in a SUFFIX are the same as those for the PREFIX of the same size.

A one byte combined PREFIX-SUFFIX is referred to as a TOKEN, which is used to represent a non-value DATA object of the given type. The preferred embodiment of a TOKEN is shown identically as the 1-byte versions of PREFIX and SUFFIX. The TOKEN is used to indicate the absence of an expected value of the indicated DATA type: by definition, a TOKEN is a DATA object. The TOKEN, like other BRACKETs, contains one bit denoted above as the 'X' bit: this is used to indicate that the TOKEN is a test object, which may be specially handled by a program that employs the invention. Non-value instances other than 'absent' are not denoted by a TOKEN, but rather by an object of the same TYPE with full BRACKETS, as described below in the section on object TYPEs.

The two BRACKETs of each object hold identical TYPE information that characterizes the object. For a PREFIX or SUFFIX of two bytes or larger, there is a separate TYPE byte, which covers all object types. The TYPE byte is at the end of each PREFIX and at the beginning of each SUFFIX. The TYPE byte provides information about the object depending on the values of specific bits in the byte. The preferred embodiment of the TYPE byte is illustrated in detail in FIG. 2. A TOKEN, which is by definition a DATA object, contains the subset of 5 bits from a TYPE byte which is used to represent DATA object types.

The TYPE system required by the invention requires that each BRACKET be able to represent a range of at least 10 unique object types, each of which is mentioned in this section (there are eight sub-types of DATA, plus CONTAINER and SYSTEM objects). In the preferred embodiment, these values are represented in 6 of the 8 bits of one byte in each BRACKET, and as a consequence that byte is referred to as the 'TYPE BYTE'. An exception is made for the one-byte TOKEN, which is by definition a DATA type of object, so it need contain only the 8 subtypes that are defined for DATA objects. Note that the numerical type identifications that can be stored in the TYPE BYTE exceed the 10 TYPES defined for the present invention, so there is ample room for extension of the typing system within the preferred embodiment. The structure of BRACKETS and of the TOKEN are discussed below.

Every object except a TOKEN can store further sub-typing in an optional Extended Information Structure that lies within the BRACKET of an object.

All typing serves the same purposes: to associate objects with unique behaviors defined for the object contents by the invention, and to separate different data value representation schemes from one another.

In the present invention, objects written to file as one type can only be recovered from the file as that type: for example, an integer written to file can be identified later as an integer and can only be read as an integer; a CONTAINER object written to file can only be managed as a CONTAINER and cannot be mistaken for an integer or any other DATA object. SYSTEM objects are not exposed to programmers through the API, but the same rule applies that the object is distinguished by TYPE and cannot be manipulated by functions appropriate to a different object TYPE.

The reason for defining multiple sub-types is to allow the differentiation of object behaviors which facilitate data storage and manipulation. The behaviors described below for each particular TYPE are specific to that TYPE in the invention and must be enforced by any implementation of the invention.

J. Extended Information.

The present invention provides for the optional inclusion of an Extended Information structure within any object. The preferred embodiment is shown in FIGS. 14A through 14G.

Extended Structure Block A 1401 is present if the 'E' bit in the BRACKET is set. The structure of Blocks A 1401, B 1402 and C 1403 are shown in FIGS. 14B, 14C, and 14D. In each Block, the Size component 1404, 1407 and 1410 is a byte that holds a flag in the high bit; if the high bit is 0, the size encoded in the lower 7 bits is the offset to the enclosed content 305; if the high bit is 1, the size encoded in the lower 7 bits is the offset to the next Block, which itself begins with a Size byte. For example, if Block B 1402 is present, the high bit of the Size byte 1407 is 0 if the lower 7 bits hold the offset to the object content and 1 if the lower 7 bits hold the offset to the next Block. FIGS. 3A and 3B show the relative placement of object CONTENT 305 immediately following the optional Extended Information structure 304, which together make up the object BODY 302.

As shown in FIG. 14E, the Flags component 1405 of Block A is a byte in which the bits are used as follows:

| bit number | significance if set to 1 |
| --- | --- |
| 7 | 1-byte Type Map is present |
| 6 | 8-byte (64 bit) ID is present |
| 5 | 2-byte Class Number is present |
| 4 | 1-byte decryption method index is present |
| 3 | 1-byte decompression method index is present |
| 2 | component of 3-bit checksum method index |
| 1 | component of 3-bit checksum method index |
| 0 | component of 3-bit checksum method index |

As shown in FIG. 14F, the Flags component 1408 of Block B is a byte in which the bits are used as follows:

| bit number | significance if set to 1 |
| --- | --- |
| 7 | 1-byte Platform Type is present |
| 6 | 2-byte modification time stamp is present |
| 5 | 2-byte Access Id is present |
| 4 | 1-byte access rights value is present |
| 3 | 1-byte access grade value is present |
| 2 | Id Access flag: Access Id required |
| 1 | 1 to 40 byte name string is present |
| 0 | 1 to 80 byte comment string is present |

As shown in FIG. 14G, the Flags component 1411 of Block C is a byte in which the bits are used as follows:

| bit number | significance if set to 1 |
| --- | --- |
| 7 | 2-byte Class Number is present |
| 6 | 2-byte modification time stamp is present |
| 5 | 2-byte access id is present |
| 4 | 1-byte access rights value is present |
| 3 | 1-byte access grade value is present |
| 2 | Id Access flag: Access Id required |
| 1 | 1 to 40 byte name string is present |
| 0 | 1 to 80 byte comment string is present |

Block C is used when the object is encrypted. In that case, the information listed above for inclusion in BLOCK C is copied from the identical values in BLOCK A (Class Number) and BLOCK B (all other elements) and then deleted from the origin. The entirety of BLOCK C is then encrypted separately from the object CONTENT 305 but with the same password; thus, an authorized user can attempt to decrypt the object with the correct password, but the required access rights and HANDLE ID can be checked by decryption of BLOCK C and comparison of the values with the current HANDLE ID and rights before the object decryption will proceed.

The present invention comprehends the possibility that the information shown structured as above in the preferred embodiment might also be represented by a structure based on larger size and flag components, such as 16 bits rather than 8 bits; in such as case there might be no need to "daisy chain" blocks, so all of the Extended Information might be kept in one block.

The defining capability of the Extended Information structure is that the presence of every element other than the size and flag information is optional, so that no space is used unless the information element is present (which will be indicated by the appropriate flag bit). Furthermore, even the size and flag components are not present when no Extended Information element is present (in which case the BRACKETS will indicate that no Extended Information is present).

Type. When the 'Type' flag is set, the matching 'Type' field contains an 8-bit number which identifies the value mapping system which applies to the contents of the object. This value is by definition type-specific. The mappings presently used in the preferred embodiment are as follows:

| Affected TYPE | Bit Pattern | Meaning |
| --- | --- | --- |
| CHAR and STRING | 00000000 | null |
| | 00000001 | ASCII symbols: 7-bit |
| | 00000010 | UNICODE-2 symbols: 16-bit |
| | 00000100 | ASCII symbols: 8-bit |
| | 00001000 | UNICODE-4 symbols: 32-bit |
| SIGNED INTEGER | 00000000 | positive infinity |
| | 00000001 | Not a Number |
| | 11111111 | negative infinity |
| UNSIGNED INTEGER | 00000000 | positive infinity |
| | 00000001 | Not a Number |

In the case of CHAR and STRING objects, the HANDLE facility, provided by the invention for the manipulation of objects, exists at all times in a symbol-specific state, which can be modified at any time. This state determines the storage space allocated for each CHAR object (or CHAR in a STRING) and the acceptable value ranges which may be appropriately assigned for that symbol set. The Type map for CHAR/STRING is maintained as a HANDLE state, but the map is not placed into an Extended Information Structure when an object is created unless an appropriate API call is made through the HANDLE.

The 16-bit and 32-bit UNICODE representations use symbol mappings for many languages (including alphabetic and ideogram systems) promulgated by the UNICODE CONSORTIUM and now being adopted as an ISO (International Standards Organization) standard. The invention allows assignment of these symbol sets to CHAR and STRING objects, as mentioned above, which permits the invention to manage text with mixed languages.

Identifier. When the 'Identifier' flag is set, the 'Identifier' field contains a 64-bit number that is unique to the object. Each computer on which the invention is used is set up with a unique node identifier in a configuration file to assure universal uniqueness of the identifier, because the node identifier number provides part of the 64 bits of value. The invention maintains its own unique object sequence numbering that is applied to the other bits. This numbering system facilitates the association of objects with one another by programs which use the invention.

Class Number Because the objects of the present invention may be used for persistent file storage in support of object-oriented programming under circumstances where the structure and behaviour of objects are defined beyond the scope of the invention, provision is made by the invention to allow programmers to assign numbers to objects as a means of identifying them as instances of classes.

For example, a programmer might choose to assign the number '87' to a particular data structure that serves as a node in a linked list in computer memory. The data elements of that structure could be represented in the invention as DATA values of the sub-types chosen by the programmer, and the whole structure would consist of a CONTAINER object holding those contents; in this example, every instance of such a CONTAINER in an MFILE would have the value '87' in the 'Type' element of the Extended Information structure of the CONTAINER.

Encryption. When the 'Encrypted' flag is set, the value present in the 'Decryption Method' field is a number that indicates which encryption method was used. A user-definable configuration file is used by the invention to associate the user-assigned number with a decryption algorithm or program. Decryption Method '0' is reserved as unspecified, leaving to the programmer the responsibility for choosing the correct algorithm. The actual content of this element is implementation specific.

Compression. When the 'Compressed' flag is set, the value present in the 'Compression Method' field is a number that indicates which compression method was used. A user-definable configuration file is used by the invention to associate the user-assigned number with a decompression algorithm or program. The actual content of this element is implementation specific.

Checksum. Three bits are used for the 'Checksum' flag, which allows it to serve directly as an information element. If the three bit element holds a non-zero value, there is a 'Checksum Amount' element in the Extended Information structure that holds the checksum calculated on the object BODY 302, which is shown in FIG. 3A. The 'Checksum Method' element contains a number that indicates which checksum method was used (which also implies the storage size for the calculated checksum), and the 'Checksum Amount' field contains the calculated checksum. If the object content is intact, a re-calculation of the checksum at the time of a READ action will confirm the result that was stored in the 'Checksum Amount' element.

Referencing FIGS. 3A and 3B, the checksum is applied to the object BODY 302, which includes the optional Extended Information structure 304. The checksum is not applied to the object BRACKETS. In the case of a CONTAINER object, all parts of all contained objects are included in the checksum; in the case of a DATA object, only the enclosed data value or values are included.

Platform. This information categorizes computer platforms, which consist of computer processors combined with operating systems and in some cases with compilers, so that the characteristics of the platform on which the object data value was created can be stored with the object. This permits implementation of the invention to make any platform-specific adjustments that may be necessary. The actual content of this element is implementation specific and not a part of this invention, but the inclusion and placement of storage for this category of information within the object is part of the invention.

Date and Time. This item stores the most recent data modification date of an object (the creation date, at first). The actual content of this element is implementation specific and not a part of this invention, but the inclusion and placement of storage for this category of information within the object is part of the invention.

Access Identifier. This item stores a programmer-supplied identifier which was used at creation of the object and which, if the 'Id Access Flag' discussed below is set, must be submitted by any HANDLE in order to access the content of the object. The actual content of this element is implementation specific and not a part of this invention, but the inclusion and placement of storage for this category of information within the object is part of the invention.

Access Rights. This item stores the rights which must be possessed by a HANDLE in order to access the content of the object. The actual content of this element is implementation specific and not a part of this invention, but the inclusion and placement of storage for this category of information within the object is part of the invention.

Access Grade. This item stores the supervisory level which must be possessed by the HANDLE in order to access the content of the object. The actual content of this element is implementation specific and not a part of this invention, but the inclusion and placement of storage for this category of information within the object is part of the invention.

Id Access Flag. In the event that an Access Identifier was used to create an object, the requirement that the same identifier must be present in any HANDLE accessing the object is subject to an ON/OFF toggle controlled by this flag. The actual content of this element is implementation specific and not a part of this invention, but the inclusion and placement of storage for this category of information within the object is part of the invention.

Name. Any object may be assigned a null-terminated string name, using any binary single-byte values in the string (except that a null will terminate the string). In the preferred embodiment this string may be up to 32 characters in length. Symbol mapping for this element is controlled by the Type Map in the Extended Information structure. The actual content of this element is implementation specific and not a part of this invention, but the inclusion and placement of storage for this category of information within the object is part of the invention.

Comment. Any object may be assigned a null-terminated string comment, using any binary single-byte values in the string (except that a null will terminate the string). In the preferred embodiment this string may be up to 80 characters in length. Symbol mapping for this element is controlled by the Type Map in the Extended Information structure. The actual content of this element is implementation specific and not a part of this invention, but the inclusion and placement of storage for this category of information within the object is part of the invention.

K. Magic String.

The MAGIC STRING is a component of the invention that is employed to represent the logical position of an object within the MFILE. The MAGIC STRING is a null-terminated value of variable length which has a binary representation that may be envisioned as a Dewey Decimal number in which containment levels are separated by periods and cardinal positions within a contained level are represented by positive integer numbers.

The MAGIC STRING is present in each FOCUS ENTRY on the FOCUS LIST which has a logical position in the MFILE (NOTE: a REMOVED object has no logical position in the file). The values of the MAGIC STRINGs are the basis for sorting the FOCUS LIST entries in logical order of object PREFIX positions. For example, the FOCUS ENTRIES for contained objects will be placed in the FOCUS LIST after the FOCUS ENTRY of their CONTAINER and before the FOCUS ENTRY for any object represented in the FOCUS LIST that is logically located after that CONTAINER at the same level as the container. The rules for sorting are discussed later in the FOCUS LIST topic.

Object logical positions are encoded in the bytes of a MAGIC STRING as follows in the preferred embodiment: 1. beginning at the start of the byte sequence, cardinal object position at each level is encoded in a series of bytes in which the value is stored in the 7 low-order bits and the single high-order bit is used as a flag to indicate the end of the series (the end may be thought of as a 'period' in a Dewey Decimal number); 2. the value bits of the bytes in the series are packed together, in the preferred embodiment, in a 32-bit variable, padded with '0' bits in the high order range; and 3. in the preferred embodiment, the 32-bit variable is interpreted as an unsigned long integer to obtain the cardinal position of the CONTAINER at any nesting level and to obtain the cardinal position of the object at the deepest nested object represented in the MAGIC STRING. Thus, for each level represented there is a byte with a high-order bit set to '1', the last of which is succeeded by a null terminating byte.

Figure 16A:
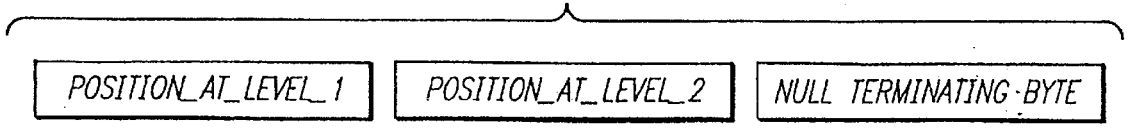
FIG. 16A illustrates the encoding of a MAGIC STRING for two levels.
Figure 16B:
FIG. 16B illustrates the encoding of a level in the MAGIC STRING.
Figure 16C:
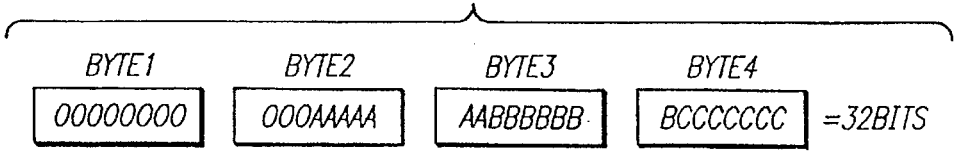
FIG. 16C illustrates the MAGIC STRING of FIG. 16B after the encoded information has been decoded into a 32 bit variable.

The encoding described in the preceding paragraph is illustrated in FIGS. 16A, 16B and 16C. FIG. 16A shows a MAGIC STRING that represents an object nested inside a CONTAINER, in which the MAGIC STRING has 3 components: a byte series for level 1, a byte series for level 2, and a null terminating byte. A byte series consists of 1 or more bytes. FIG. 16B illustrates a byte series consisting of 3 bytes, of which the value bits are represented by letters A, B and C, and the terminating flag bit is represented by the number '1'. FIG. 16C shows the result of packing the value bits together into a 32-bit variable, left-padded with '0' bits, which yields an integer number that gives the cardinal position of the object at the represented level.

L. Handle and Focus.

The present invention includes a programming facility, known as a "HANDLE", which both allows and controls access to objects within an MFILE. The HANDLE ensures fiat access to an MFILE is performed in a manner consistent with the file structure which is dictated by the invention. Each file of the present invention is itself an "object" which can contain any number of objects within it. A HANDLE references one object at a time—that is, the file as a whole or some object within the file. The reference to an object by a HANDLE is called FOCUS. The FOCUS of the HANDLE is unaffected by the logical expansion of the file in areas closer to the beginning of the file, even though that expansion apparently alters the offset of the objects that are farther out in the file.

A HANDLE is in one of four positional states at a given time. The most common state, which it assumes at inception, is to have FOCUS on an object (the initial object is the HEAD of the MFILE). The other three states pertain to positions within a CONTAINER object whenever no specific object is in FOCUS: the HANDLE may assume a 'pre-first' or 'post-last' position, or it may be placed in a 'null' position. The 'pre-first' position is used to append objects in reverse order into the FIRST position in a CONTAINER. The 'post-last' position is used to insert objects in order into the LAST position in a CONTAINER. The 'null' position results when the HANDLE moves into an empty CONTAINER or when the HANDLE removes the last object from a CONTAINER, thereby causing the CONTAINER to become empty.

When an object is in FOCUS, its TYPE and size and Extended Information are accessible by QUERY action, and if the object is a DATA object then its stored data values are accessible by READ action. When a HANDLE changes FOCUS from one object to another, the process is called NAVIGATION.

M. Navigation.

NAVIGATION is defined as the activity of moving the focus of a HANDLE from one object to another object or into a non-FOCUS positional state. Adjacent objects are reached by "next" and "prior" commands. Contained objects are reached by a "move in" command, and CONTAINER objects are reached by a "move out" command. (The exact names associated with the foregoing navigation moves are not essential to the invention).

When a HANDLE NAVIGATEs into a CONTAINER, it must take one of two positions: if the CONTAINER contains any objects, the HANDLE will gain FOCUS on the first contained object; otherwise the HANDLE will obtain a 'null' FOCUS. From any FOCUS, including from a 'null' FOCUS, the HANDLE may NAVIGATE to the 'pre-first' or 'post-last' positions, which are discussed below. A HANDLE may not obtain a 'null' FOCUS by any means other than by causing a REMOVE of the last contained object in a CONTAINER or by NAVIGATING into an empty CONTAINER. A HANDLE may move out of a CONTAINER from any FOCUS inside the CONTAINER and from any non-FOCUS position.

The HANDLE may not perform alterations from a 'null' FOCUS: this may be done only from an object FOCUS or from the 'pre-first' or post-last' positions, because every MFILE alteration must take place in reference to an object position. An object in FOCUS provides a point of reference for any additive alteration. The 'pre-first' position provides a point of reference for APPEND actions only; and the 'post-last' position provides a point of reference for INSERT actions only.

Navigation of a HANDLE into and out of a CONTAINER object is managed by retaining in the HANDLE a stack of references to FOCUS LIST ENTRIES which represent the current hierarchy of nested CONTAINERs into which the HANDLE has navigated in order to obtain its current FOCUS. FIGS. 17A and 17B illustrate the stack of CONTAINER FOCUS ENTRY references maintained in two separate HANDLEs and the referenced FOCUS ENTRIES on the FOCUS LIST.

N. Queries.

Any object that is in FOCUS may be subjected to a QUERY for TYPE, object size, buffer size required for variable-length data values, such as BINARY TYPE, and any item that may be contained in its Extended Information structure. The storage size query is defined only for DATA objects, and it returns the size of memory variable that is required to receive the value READ from the DATA object. The object size QUERY returns the inclusive size of the object. The available QUERIES for Extended Information may be deduced from the listing of items contained in Extended Information; however, only the existence—not the value—of Checksum, Encryption, Compression, Access Rights and Access Grade will be revealed by implementations of the invention.

O. Reads.

The value content of any DATA object can be READ when the object is in FOCUS. The invention requires that the READ action be accompanied by a variable supplied by the programmer to receive data of that DATA TYPE. If the wrong type of variable is supplied, an error will be returned.

If the DATA value is of a TYPE that has a non-fixed length, the required storage length for a receiving memory variable is available through a QUERY action.

The value content of a DATA object is accessed by reading the KEYBYTE of the PREFIX and jumping forward the length of the PREFIX (or by reading the KEYBYTE of the SUFFIX and jumping backwards the length of the SUFFIX). Accessing the first contained object consists of jumping forward from the KEYBYTE the length of the PREFIX of the CONTAINER, and accessing the last contained object consists of jumping backward from the KEYBYTE the length of the SUFFIX. As a practical matter, enclosed DATA is usually read 'forward', so access from a SUFFIX would usually include the extra step of jumping backward over the length of the DATA to its beginning. This means of access to an object is used in the invention automatically to build memory structures called FOCUS ENTRIES, which are later described.

DATA objects are always given specific sub-TYPEs. In the preferred embodiment, the minimal DATA TYPEs are SIGNED INTEGER, UNSIGNED INTEGER, FLOAT, CHAR, STRING, BOOLEAN, BINARY, and ENUMERATION, each of which has been mentioned above.

P. Alterations.

Whenever a file alteration occurs, the logical position of various file objects may be changed. The only logical object positions that matter are the ones represented on the FOCUS LIST, and for those the invention automatically updates the 'Magic String' values in the FOCUS ENTRIES as needed, so the value is up-to-date at all times, even if multiple HANDLES are operating on separate threads of execution.

When alterations are to be made to an object, the present invention permits the alteration to be made before the current FOCUS, after the current FOCUS, replacing the object at the current FOCUS, or removing the object in current FOCUS. An alteration made immediately before the FOCUS is referred to as an 'insert'. An alteration made immediately after the FOCUS is referred to as an 'append'. The FOCUS itself may be unchanged, or it can move automatically to the new object. In 'remove' operations the object in FOCUS becomes unaccessible, so the FOCUS moves automatically to an adjacent object, in the preferred order of 'next', 'prior', and 'null'.

Every additive alteration (insert, replace, append) creates a new object. When an additive alteration action is invoked, the system (1) creates a receiving buffer; (2) marks the buffer to indicate the alteration type; (3) receives the DATA written into the buffer; and (4) removes or posts the buffer to a serialized UPDATES QUEUE, where the contents of the buffer appear as a SYSTEM object followed by the added object. In case of 'remove' invention posts to the UPDATES QUEUE only the information required to build a SYSTEM object.

In the preferred embodiment the intended alteration must be declared through the HANDLE before any content is written to the receiving buffer, and the successful completion of the update must be accomplished by a COMMIT action. The COMMIT action causes the receiving buffer to be posted to the UPDATES QUEUE. An alteration pending in this sequence may also be ABANDONED, in which case the receiving buffer is erased and nothing is posted to the UPDATES QUEUE. An ABANDON or COMMIT action terminates the alteration.

The process of alterations may be illustrated by creating an example file. Such an example is illustrated in FIGS. 5A-5C. Consider the situation of creating a file to store address information for the following: Acme Corporation, New York, N.Y. 10022 212-123-4546. Referring to FIG. 5A, a CONTAINER 501 is created. Referring now to FIG. 5B, a second CONTAINER 502 is created within CONTAINER 501. CONTAINER 502 includes four DATA objects 503, 504, 505, and 506. DATA object 503 stores the "name" value (e.g. Acme Corporation). DATA object 504 stores the "city" value (e.g. New York). DATA object 505 stores the "state" value (New York), DATA object 506 stores the "zip" information (10022). There is no need to restrict the size of the DATA objects to a predetermined size, nor is there a need for external indexing information to locate individual values, because the BRACKETS provide information needed to navigate easily through the file.

Consider now the situation where a programmer desires to modify the logical file to provide a second name DATA object (e.g., a contact person) and a phone number as part of the file, and desires that the new information be located at the beginning of the file. Referring to FIG. 5C, a new CONTAINER 507 is created and added to the file in front of and at the same level as CONTAINER 502. The new CONTAINER 507 includes DATA objects 508 name2", and 509 phone".

FIGS. 10A-10C illustrate the state of the physical file stored in memory during the creation and manipulation of the logical file of FIGS. 5A-5C. Referring first to FIG. 10A, there is stored in memory a CONTAINER 1001 that is a representation of the logical CONTAINER 501.

Referring now to FIG. 10B, when a change is made to a logical file, a "SYSTEM object" 1020 is created that contains information about how the information added in FIG. 5B to the logical file is added, the logical relationship between the additional information and the existing information, when the change is made, etc. The SYSTEM object is written at the end of the existing file, (in this case, at the end of CONTAINER 1001) along with the additional file information, new CONTAINER 1002 and DATA objects 1003-1006. The SYSTEM object contains all the information necessary to place its associated DATA logically in the file.

Referring now to FIG. 10C, another SYSTEM object 1021 is written for the second name and phone number DATA objects to be added to the file in a new CONTAINER. The second command object 1021 is appended at the physical end of the stored file even though logically, the information is added at the beginning of the file. Following the command object 1021 is the new CONTAINER 1007, and new DATA objects 1008 "name2" and 1009 "phone".

Q. Updates Queue.

The UPDATES QUEUE receives alterations to the MFILE and serializes their effect on the MFILE. The updating procedure is a follows: (1) the write object is obtained from the UPDATES QUEUE; (2) a SYSTEM object is written to the TAIL of the MFILE; (3) the alteration is implemented: a new object is added to the TAIL of the MFILE, the FOCUS is modified or a new FOCUS ENTRY is created; and necessary DATA length changes and logical position changes are made to FOCUS ENTRIES for all enclosing CONTAINERS that have their object lengths changed by the alteration. The use of a separate thread of execution for updates processing is an option, not a requirement, of the invention.

When a HANDLE makes a change to a file, a description of that change is placed in an UPDATES QUEUE, which is a linked-list of buffers or pointers to buffers in memory. The UPDATES QUEUE is a FIFO list. The UPDATES QUEUE is used to serialize the updates to a file. This facilitates DATA integrity when multiple handles are attempting to make changes to a file. When changes are made to the file, changes are made from the UPDATES QUEUE in serial order and written onto the TAIL of the file. Some alterations are time intensive. Use of the UPDATE QUEUE allows a HANDLE to put the update into the queue and then proceed with other activity.

R. Focus Entry.

The FOCUS ENTRY holds a unique logical position marker called a MAGIC STRING that is updated in memory whenever a file alteration occurs that changes the logical position of the object referred to by the FOCUS ENTRY. By contrast, a SYSTEM object, which holds the information needed to rebuild the FOCUS ENTRY in case of computer process interruption, is designed to be written to file, where access for the purpose of updating logical position information is most awkward. For this reason, the SYSTEM object contains the MAGIC STRING of the reference object which was current at the time the ALTERATION represented by the SYSTEM object was processed.

The format of the FOCUS ENTRIES in the FOCUS LIST is illustrated in FIG. 13. The entry 1300 begins with a user count 1301 that tracks the number of HANDLEs focusing on the object or using the FOCUS ENTRY. The needed count 1302 indicates how many unprocessed alterations have the FOCUS as a reference and how many HANDLES have the object in FOCUS or have a contained object in FOCUS. Object information 1303 stores object variables, including the PREFIX KEYBYTE location, the object CONTENT location, the BRACKET size, and the object length. Only the location of the PREFIX KEYBYTE is required, but it is useful to maintain additional information in the FOCUS ENTRY to improve efficiency by reducing file access. Flags 1304 identify an object as pending removal or pending replacement.

The MAGIC STRING 1305 stores information about the logical position of the PREFIX KEYBYTE of an object in the MFILE. The logical position of the PREFIX KEYBYTE is the basis of sorting of the FOCUS LIST. The logical ordering of the PREFIX KEYBYTEs is defined as the order of the locations at which the PREFIX KEYBYTEs of objects will appear in the HEAD of an MFILE after RECONSTITUTION, which is an order that by definition excludes duplication since only one KEYBYTE can appear at a physical location in a file. The comparison of MAGIC STRINGs of FOCUS ENTRIES yields this order.

REMOVEd objects present a complication, because they will have no physical position in the RECONSTITUTED file. This complication is solved by marking the FOCUS ENTRY for a REMOVEd object and keeping that FOCUS ENTRY in the FOCUS LIST position that it held immediately before removal, relative to other FOCUS ENTRIES on the FOCUS LIST.

An additive ALTERATION (INSERT, REPLACE and APPEND) yields a FOCUS ENTRY that is placed on the FOCUS LIST in position relative to the FOCUS ENTRY of the object which served as a reference for the ALTERATION. As a result, the FOCUS ENTRY for an APPENDed object always follows the FOCUS ENTRY for its reference object, and the FOCUS ENTRY for an INSERTed object always precedes the FOCUS ENTRY for its reference object. Initially, these FOCUS ENTRIES are adjacent; later ALTERATIONs may separate those FOCUS ENTRIES with new FOCUS ENTRIES, but the relative positions on the FOCUS LIST of the FOCUS ENTRY for the added object and the FOCUS ENTRY for the reference object are never switched.

The result of these sorting rules is that the FOCUS LIST represents the logical ordering and prospective physical placement of all objects that must be copied to a new MFILE when RECONSTITUTION takes place. The FOCUS LIST also serves as the central reference point for logical NAVIGATION of the MFILE, which is accomplished by walking the FOCUS LIST (adding FOCUS ENTRIES along the way for unrepresented MFILE objects that are encountered).

S. Focus List.

Information about the logical position of old and new objects in a file must be available in order for HANDLES to navigate on the file and in order to reconstruct the file in logical order. This information is stored in a combination of memory structures called "FOCUS ENTRIES", logical position values known as "MAGIC STRINGS", and a compilation of the focus entries called a "FOCUS LIST". Information needed to re-create these memory structures after an unexpected computer shutdown is kept in SYSTEM objects which are written to the TAIL of a file as part of the updating procedure.

The fact that an object exists in an MFILE does not itself create a need for that object to be represented by a FOCUS ENTRY on the FOCUS LIST. A FOCUS ENTRY needs to exist for an object only when one or more of the following conditions is met: 1. The object is held in FOCUS by a HANDLE. 2. The object is a CONTAINER and some HANDLE has FOCUS on an object inside the CONTAINER. 3. The object has been REMOVED logically from the MFILE but it is still in the physical MFILE because RECONSTITUTION has not yet taken place. 4. The object was used as reference for an ALTERATION which has not yet been processed.

When an object in FOCUS is nested within one or more levels of CONTAINER objects, the HANDLE keeps track of every focus entry which represents one of the enclosing CONTAINER objects, even though it might be the case that none of the CONTAINER objects is directly referenced by a HANDLE. The FOCUS ENTRY is retained in memory as part of the FOCUS LIST as long as there is a HANDLE which has focus on a contained object at a lower level. Thus, each HANDLE retains a stack of references that point at the FOCUS ENTRIES which represent containing objects. That reference provides information to prevent NAVIGATION beyond the boundaries of the retaining objects.

Any object that has been added to the TAIL Of the MFILE also has an entry in the FOCUS LIST until the file has been reconstituted or the object has been removed. Any object that has been removed from the HEAD of the file has an entry in the FOCUS LIST until it has been physically removed from the file by RECONSTITUTION. This makes it possible to track the logical positions of objects added to the file, without having to read the file and its associated SYSTEM objects, and it makes the RECONSTITUTION algorithm simpler.

FOCUS LIST entries that are not needed to support the current FOCUS of a HANDLE are eliminated by the RECONSTITUTION procedure. Any object that has been added to the TAIL of the MFILE and then REMOVED prior to RECONSTITUTION need only have its FOCUS ENTRY removed from the FOCUS LIST: because it lacks a FOCUS ENTRY, it will not be copied to the HEAD of the MFILE during a subsequent RECONSTITUTION. A more detailed discussion of RECONSTITUTION is presented in a later section.

FIG. 11 illustrates the FOCUS LIST of the present invention. A FOCUS LIST 1100 includes a number of entries 1101, 1102, 1103, etc. Each entry in the FOCUS LIST 1100 is referred to as a FOCUS ENTRY. Each FOCUS ENTRY represents an object in the file.

Consider the file consisting of CONTAINER 1120 containing DATA objects 1121, 1122, and 1123. There is a HANDLE with FOCUS on object 1123; therefore, there is an entry 1101 in the FOCUS LIST for the CONTAINER 1120 of object 1123 and there is an entry 1102 in the FOCUS LIST for object 1123.

The FOCUS LIST is a dynamic list and changes as HANDLES move their FOCUS around the file and make changes in the file. The FOCUS LIST is a data structure in computer memory. Each open file in the present invention has an associated FOCUS LIST. In the example shown, the "parent" of each DATA object 1121, 1122, and 1123, is the CONTAINER 1120. Therefore, for example, whenever a HANDLE has FOCUS on DATA object 1123, represented by FOCUS ENTRY 1102 as shown in FIG. 11, there is an entry in the FOCUS LIST for CONTAINER 1120. This is illustrated in FIG. 11 by FOCUS ENTRY 1102 for the PREFIX of object 1123, and entry 1101 for CONTAINER 1120. The FOCUS LIST is sorted in logical order from least to greatest as defined above in this section and in the previous section. The entry for the parent CONTAINER 1120 is thus higher than the entry for the contained object 1123 in the FOCUS LIST of FIG. 11.

When a HANDLE is navigating, it uses the FOCUS LIST to move among objects in their logical order. For example, consider the case illustrated in FIG. 12 when HANDLE h1 is to ascend from FOCUS on the object 1123, represented by FOCUS ENTRY 1102, as shown in FIG. 11. HANDLE h1 first examines the FOCUS LIST to access the parent to determine if the ascension is within the boundaries of the file. In this case, the ascent from object 1123 to CONTAINER 1120, is within the boundaries of the file, so HANDLE h1 moves its reference to FOCUS ENTRY 1101, representing object 1120. If it is desired to continue to ascend, the HANDLE again examines the FOCUS LIST to determine if the ascent is within the file boundaries. In this case, continued ascent is in fact outside the boundaries of the file so the navigation move does not proceed.

When NAVIGATING to a logical position, the HANDLE first scans the FOCUS LIST to determine if a FOCUS ENTRY already exists for the destination. If so, the HANDLE obtains a reference to that FOCUS ENTRY and the NAVIGATION is accomplished. This requires no file I/O for NAVIGATION purposes. If, however, the logical position is occupied by an object in the file which is not currently represented by a FOCUS ENTRY, then a FOCUS ENTRY is created from the object in the file so that the HANDLE can obtain a reference to it.

The FOCUS ENTRIES track the number of HANDLES that are focusing on an object at one time, in order to prevent contention problems. When two or more HANDLES have FOCUS on an object, no ALTERATIONs to that object are permitted (but 'append' and 'insert' in reference to that object are allowed). The system of the present invention thus prevents simultaneous object ALTERATION by separate HANDLEs without requiring a specific object locking or range locking action.

The FOCUS ENTRIES on the FOCUS LIST provide the mechanism for HANDLE NAVIGATION and object manipulation, but they largely depend for their information content upon the structure and information content of the MFILE objects which they reference. The integration of these object structures with the memory-based object control mechanism is an essential part of the present invention.

The algorithms for NAVIGATION are described as follows:

DESCEND (allowed only into CONTAINER objects)
   If desired FOCUS is in FOCUS LIST
      Return it
   Else
      Find object after current FOCUS PREFIX and before current object SUFFIX, skipping removed objects
      If there is no object contained within the current focus, go to a 'null' FOCUS
      Return the FOCUS
ASCEND (to a higher-level CONTAINER object)
   Dispose of current FOCUS if no longer needed
   Return enclosing FOCUS (retained in HANDLE stack)
NEXT
   If desired FOCUS is in FOCUS LIST
      Return the new FOCUS
   Else
      Find the object after the current FOCUS SUFFIX and within the enclosing CONTAINER, skipping removed objects
         If the object is not represented yet on the FOCUS LIST, look into the physical file for the object and build a FOCUS ENTRY for it
         If the desired object does not exist, return an error and retain the original FOCUS
         If the old FOCUS is no longer needed, dispose of it
PRIOR
   If desired FOCUS is in FOCUS LIST
      Return the new FOCUS
   Else
      Find the object before the current FOCUS PREFIX and within the enclosing CONTAINER, skipping removed objects
         If the object is not represented yet on the FOCUS LIST, look into the physical file for the object and build a FOCUS ENTRY for it
         If the desired object does not exist, return an error and retain the original FOCUS
         If the old FOCUS is no longer needed, dispose of it
T. Reconstitution.

The RECONSTITUTION procedure realigns the physical file with the logical file. When changes are made to an MFILE, representation of the changes in the form of SYSTEM objects arid associated new DATA and/or CONTAINER objects are added to the end of the file. All objects added to the end of the file constitute the TAIL of the MFILE.

RECONSTITUTION is invoked when the last HANDLE opened on an MFILE is closed. It is also invoked when certain conditions are met: these are conditions chosen to optimize performance of implementations of the present invention. These conditions generally fall into the the following categories:

1. The TAIL gets too long.
2. The TAIL has too many objects in it.
3. Too much time has passed since the last RECONSTITUTION.
4. The ratio of TAIL size to HEAD size becomes too great.
5. The FOCUS LIST occupies too much memory.
6. NAVIGATION using the FOCUS LIST takes too long.

RECONSTITUTION uses information in the FOCUS LIST to identify changes in the MFILE and to copy the changes in logical order to a new reconstituted MFILE, thereby aligning the physical condition of the MFILE to its logical condition. Although change information is also found in the SYSTEM objects, SYSTEM objects are not read during normal operation of the invention. This is because changes represented in the SYSTEM objects are also found in the FOCUS LIST.

The result of RECONSTITUTION is a new file HEAD object with no file TAIL, unless a separate thread was available for ongoing ALTERATIONS. The RECONSTITUTED MFILE is substituted for the old MFILE and the new file is given old file name. By the end of the RECONSTITUTION, each FOCUS ENTRY either has been updated to reflect the new physical object positions in the RECONSTITUTED file or it has been removed from the FOCUS LIST because it is no longer needed.

If separate threads of execution are available during RECONSTITUTION, the MFILE can continue to be altered if the alterations occurring during the RECONSTITUTION take place on a separate thread of execution. In this case, only changes to the MFILE completed prior to the start of the RECONSTITUTION process are reconstituted, and the new changes made during RECONSTITUTION are added as a TAIL to the RECONSTITUTED MFILE.

In the present description, the following definitions apply: MFile=The file that is being reconstituted. FList=The focus list being used prior to and external to the RECONSTITUTION. MF2=The file that is the result of RECONSTITUTION. FL2=The temporary focus list created for use during the RECONSTITUTION process. F, FGRP=Represent focus list entries.

FIGS. 6A and 6B are a flow diagram illustrating the RECONSTITUTION process. At step 601, alterations to MFile and FList are halted. That is, the state of a file as of a certain point is selected for the RECONSTITUTION process. Any subsequent alterations are not part of the RECONSTITUTION process. At step 602, FL2 is created by copying only those entries in FList that are necessary for RECONSTITUTION. (Step 602 is described in detail in the flow diagram of FIG. 7).

At step 603, the end of the tail of MFile is recorded, identifying the last alteration that is to be part of the RECONSTITUTION process. At step 604, alterations to MFile and FList are resumed. These alterations are not part of the current RECONSTITUTION process but rather are reconstituted in the next RECONSTITUTION process (if they are completed at that time). At step 605, MF2 is opened.

At step 606, groups from MFile are copied to MF2 in reconstituted form, using FL2 to identify changes that need to be made. This step is illustrated in detail in the flow diagram of FIG. 8. At step 607, alterations to MFile and FList are again halted, as at step 601. At step 608, any additional tail from MFile is copied to MF2, and FL2 is modified to reflect these alterations. At step 609, FList and FL2 are merged. This step removes any entries in FList that are no longer needed and updates all entries in FList that are needed. This step is illustrated in detail in the flow diagram of FIGS. 9A and 9B. At step 610, FL2 is deleted. At step 611, MFile is replaced with MF2 (the reconstituted file). A copy of MFile is retained for backup if desired. At step 612, alterations to MFile and Flist are resumed. The process ends at step 613.

FIG. 7 is a flow chart illustrating a method of creating FL2 by copying only necessary entries of FList(step 602 of FIG. 6A). At step 701 the head of the focus list is obtained (F). At step 702, FL2 is set equal to the new focus list, (consisting of a new copy of F). At step 703, F is set equal to the next Flist entry. At decision block 704, the argument "does F exist?" is made. If the argument is false (no more focus list entries), the system proceeds to step 705 and goes to the next step 603 in the flow diagram of FIG. 6A. If the argument at decision block 704 is true, the system proceeds to decision block 706.

At decision block 706 the arguments "F on tail?" or "F removed?" or "F's DATA changed?" are made. If any of the arguments are true, the FOCUS ENTRY is needed for RECONSTITUTION and so the system proceeds to step 707 and adds a copy of F (the current focus list entry) to FL2 and then returns to step 703. If all of the arguments at decision block 706 are false, the system returns to step 703. This occurs when the current focus list entry is not one that requires updating of the file. Therefore, it is skipped so that only needed focus list entries are obtained.

Figure 8:
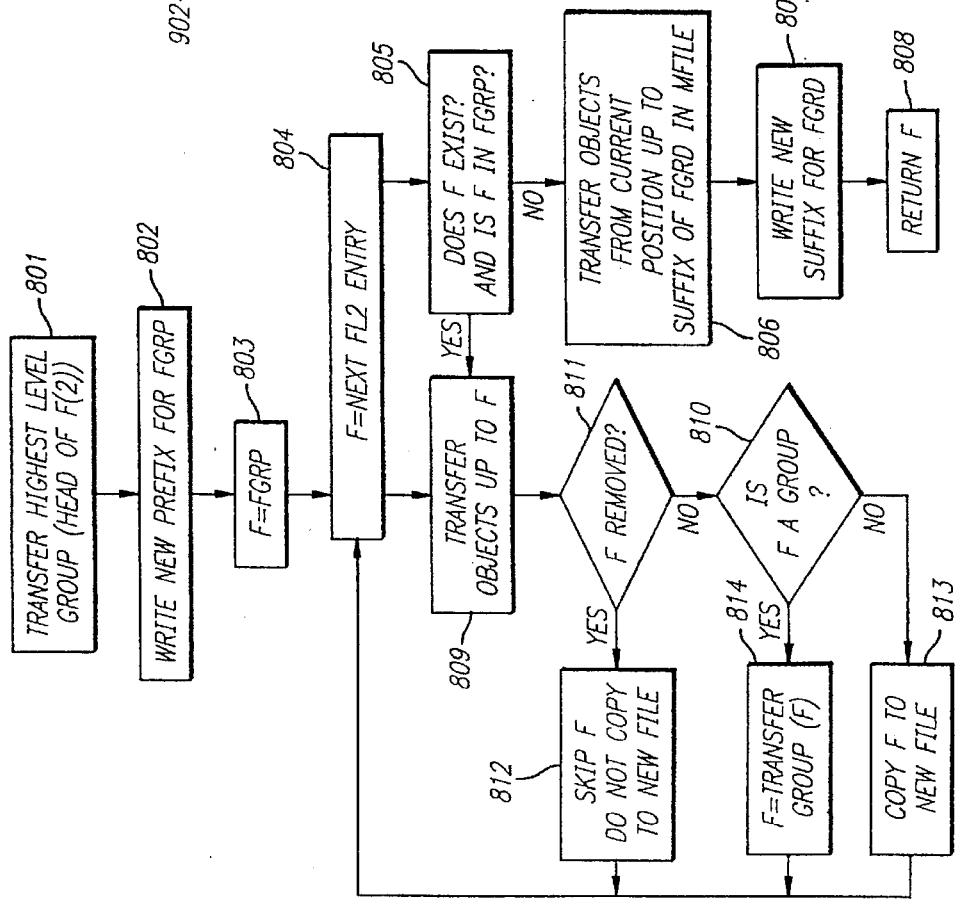
FIG. 8 is a flow diagram illustrating step 606 of FIG. 6A.

FIG. 8 illustrates the process of recursively copying groups from Mfile to MF2 in reconstituted form (step 606 of FIG. 6A), using FL2 to indicate which changes need to be made. The algorithm begins at step 801, with the highest level CONTAINER (the HEAD of FL2) via a function call like TransferGroup(Head_of_F2). At step 802 a new PREFIX is written for FGRP. At step 803, F is set equal to FGRP. The new PREFIX encodes the reconstituted size of the object, using the old data length and the data length change information which is maintained in the FOCUS ENTRY. At step 804 F is set equal to the next FL2 entry after F.

At decision block 805 the argument "Does F exist? and Is F in FGRP?" is made. If the argument is false, the system proceeds stops 806–808. At step 806 objects are transferred from the current position up to SUFFIX of FGRP in MFile. At step 807, a new SUFFIX for FGRP is written. F is returned at step 808. If the argument at decision block 805 is true, the system proceeds to step 809. At step 809 a transfer of objects up to F occurs. At decision block 811 the argument "Is F removed?" is made. If the argument is true, F is skipped, not copied to the new file at step 812. If the argument is false, the system proceeds to step 810.

At step 810, the argument "Is F a group?" is made. If the argument is false, F is copied to the new file at step 813. If the argument at decision block 810 is true, the system proceeds to step 814, and F is set equal to the return of the function call TransferGroup(F), which causes a recursive invocation of the algorithm. The system then returns to step 804 from steps 812, 813 and 814.

Figure 9A:
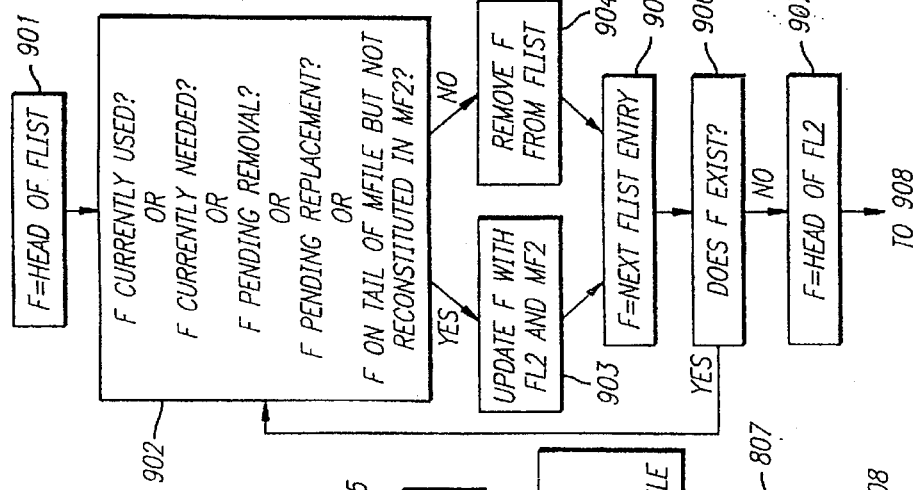

FIGS. 9A and 9B illustrate a method of merging FList and FL2 (step 609 of FIG. 6B). The steps remove any entries in FList that are no longer needed and update all entries in FList that are needed. At step 901, F is set equal to head of FList. At decision block 902 the arguments "F currently used?" or "F currently needed?" or "F pending removal?" or "F pending replacement" or "F on tail of MFILE but not reconstituted in MF2?" are made. If any of the arguments are true, the system proceeds to step 903 and F is updated with FL2 and MF2. If all the arguments at decision block 902 are false, the system proceeds to step 904 and F is removed from FList.

After steps 903 or 904, the system proceeds to step 905 and F is set equal to next FList entry. At derision block 906 the argument "Does F exist?" is made. If the argument is true, the system returns to decision block 902. If the argument at decision block 906 is false, the system proceeds to step 907. At step 907, F is set equal to head of FL2. At decision block 908, the argument "Has F been removed since RECONSTITUTION began?" is made. If the argument is true, the system proceeds to step 909. If the argument is false, the system proceeds to step 910.

At step 909, F is added to FList. At step 910, F is set equal to next FL2 entry. At decision block 911, the argument "Does F exist?" is made. If the argument is true, the system returns to decision block 908. If the argument at decision block 911 is false, the system proceeds to step 912 and goes to the next step (610).

U. Recovery.

Under normal operating circumstances, the SYSTEM objects on the TAIL of an MFILE are not used for any purpose. The reason for this is that all necessary information relating to logical file structure is retained in the FOCUS LIST. In the event of unexpected interruption of the computer process that employs the present invention, however, the SYSTEM objects are used to reconstruct the FOCUS LIST when the process resumes. The same circumstance applies when an MFILE must be reconstructed from its JOURNAL. Note that in all cases except the REMOVE action, the SYSTEM object is followed in the TAIL by the object or objects that are to be added.

To RECOVER the FOCUS LIST from the TALL, each SYSTEM object is processed sequentially. If a SYSTEM object represents an INSERT, REMOVE or APPEND action, a FOCUS ENTRY is created for each enclosing CONTAINER which is not already on the FOCUS LIST. Then a FOCUS ENTRY is added to the FOCUS LIST for each added and each REMOVED object. If a SYSTEM object represents a REPLACE action, it is treated as an INSERT action followed by a REMOVE action. If an error in TAIL structure or object structure is detected, the affected object and the rest of the TAIL are ignored, causing a virtual truncation of the TAIL. Recovery of the rest of the TAIL is not done because the TAIL is built sequentially and the information contained in SYSTEM objects is dependent upon all prior alterations. (It would be possible to keep a disordered TAIL with sequence numbers in the SYSTEM objects). Any corrupted object completely invalidates whatever alterations are recorded after that object.

Errors that might occur in a TAIL or object structure include object structure corruption, incomplete TRANSACTIONs, and unrecognized objects. In the case of an incomplete TRANSACTION, the TAIL is effectively truncated just before the START of the TRANSACTION.

V. Journal.

Every MFILE is matched by a JOURNAL, at the option of the programmer. The invention comprehends the possibility of merging the JOURNALS for multiple MFILES that are associated with one another. The content of a JOURNAL for a given MFILE is the content of a TAIL of the MFILE just before RECONSTITUTION begins. At each occurrence of RECONSTITUTION, the matching JOURNAL is augmented by appending the TAIL removed from the MFILE. The invention also comprehends the augmentation of the JOURNAL every time that an object is added to the TAIL of the MFILE, which is a procedure that involves more processing overhead but produces a JOURNAL which is always up-to-date. The JOURNAL itself is never RECONSTITUTED. In order to allow rebuilding of a file from the JOURNAL, there must exist an earlier copy of the principal MFILE that coincides with a starting-point in the JOURNAL. The invention comprehends the possibility of including this base copy of the MFILE in the JOURNAL itself. JOURNAL entries are augmented by date-time stamps to facilitate the matching to dated copies of the principal MFILE.

A lost or corrupted MFILE can be reconstructed from its JOURNAL, provided that the JOURNAL includes all alterations since creation of the MFILE or that the JOURNAL supplements a backup copy of an earlier version of the MFILE. The procedure used is RECONSTITUTION, but— unlike normal RECONSTITUTION—the JOURNAL is not erased at the conclusion of the procedure.

An MFILE can also be restored to an earlier state by roll-backward reversal of JOURNAL entries. The reversals themselves are new alterations that are appended to the JOURNAL. A damaged file can be reconstructed from a backup copy plus subsequent changes ("deltas"). Inversely, a current file can be cycled through multiple "undo" actions to reverse the effect of alterations.

W. Transactions.

A TRANSACTION is a procedural grouping of alterations to a file that serves the purpose of assuring that all of the changes permanently affect the file if any affect the file. Transactions assure atomic completion of a set of file alterations. A TRANSACTION is started by a START TRANSACTION action and ended by a COMMIT or ABANDON action: in the case of a COMMIT, all of the alterations are made permanent by adding them to the UPDATES QUEUE bounded by BEGIN TRANSACTION and END TRANSACTION markers.

The RECOVERY and RECONSTITUTION processes will not begin during the processing of a TRANSACTION and RECOVERY will abort and restart in order to avoid adding to the FOCUS LIST or HEAD of an MFILE any parts of a TRANSACTION if the TAIL of the file contains only a BEGIN without a matching END or an END without a matching BEGIN. In the case of an ABANDON, none of the alterations within the TRANSACTION occurs, and the alterations are discarded.

There are two categories of transactions in the present invention, "fixed" and "wandering". These transactions are similar in concept, but differ in their implementations and in resultant behavior. Both transactions can be described as a set of file alterations that can be abandoned or committed as a group. The categories are differentiated by the fact that navigation among objects that are to be added is possible in a "fixed" transaction, but not in a "wandering" transaction.

A fixed TRANSACTION is implemented by creation of a temporary file and temporary handle. During a fixed TRANSACTION, the HANDLE is given focus on the temporary file and NAVIGATION is limited to the contents of the temporary file. When the fixed TRANSACTION is COMMITted, the ALTERATION occurs in the permanent file at one location only—the location specified by the ALTERATION which initiated the TRANSACTION. The ALTERATION is accomplished by plating a reference to the temporary file on the UPDATES QUEUE of the permanent file in the following order: a BEGIN TRANSACTION marker, a reference to the temporary file, and an END TRANSACTION marker. The TRANSACTION is then processed normally from the UPDATES QUEUE to the TAIL of the permanent MFILE.

Once a fixed TRANSACTION command has been issued by a handle, one nested wandering TRANSACTION can begin (but no fixed TRANSACTION). No TRANSACTIONS can be nested inside a wandering TRANSACTION.

A wandering TRANSACTION is implemented by creation of a temporary UPDATES QUEUE. When the TRANSACTION is COMMITTED, the temporary UPDATES QUEUE is appended to the permanent UPDATES QUEUE. NAVIGATION on the permanent file will not reveal the pending alterations already entered during the unCOMMITted wandering TRANSACTION.

While a wandering TRANSACTION is pending, each FOCUS relative to which an alteration is made is locked.

Since multiple handles may have parallel TRANSACTIONS pending, the locks are implemented with a "needed" count. If the TRANSACTION is ABANDONed, the locks are decremented as a group; if the TRANSACTION is COMMITted, the lock is decremented as each update is made.

When a TRANSACTION is COMMITted, SYSTEM objects for BEGIN TRANSACTION and END TRANSACTION must be created and added to the tall of a file so that upon RECONSTITUTION it is possible to require inclusion of an entire TRANSACTION as a condition of inclusion of any part of it. Thus, RECONSTITUTION is prevented between the times that BEGIN TRANSACTION has been processed from the ALTERATIONS QUEUE and the time that the matching END TRANSACTION is processed.

X. File Corruption.

The file system of the present invention provides a number of methods for error detection. For example, the PREFIX and SUFFIX must match for each set of BRACKETs: at the programmer's option, a simple comparison is used as a threshold integrity check. In addition, the PREFIX and SUFFIX must effectively point to each other. When they do not point to each other, an error is detected. Also, each BRACKET includes a parity bit which is checked for consistency with the bit pattern of the BRACKET.

The present invention provides a method for detecting, locating, and marking bad DATA objects in a file. Consider the case where there are ten DATA objects within a CONTAINER and DATA objects five, six, and seven are corrupted. Suppose also that a HANDLE has FOCUS on object four. When a move is attempted from object four to object five, the parity checks are returned as 'invalid', indicating a problem. That error triggers an error recovery routine to map out the bad DATA objects. The routine assumes that it would not have been possible to move into the CONTAINER containing the bad DATA objects if the CONTAINER BRACKETs didn't match properly. At the level of the CONTAINER, the structure of the file has integrity. The routine begins with focus at the PREFIX of the CONTAINER and navigates into the CONTAINER from the PREFIX, keeping track of the location of the first object that fails the validation check (e.g., DATA object five). Next, the routine returns to the CONTAINER level and navigates backwards from the SUFFIX of the CONTAINER, keeping track of the location of the first object in that navigation direction that fails the validation check (e.g. DATA object seven). Now the beginning and end of the bad area have been defined. A focus list entry is then constructed to describe that range and to keep track of it in memory. After that, no handle can move into the bad area or read it.

As part of the error recovery routine, a copy of the bad area can be written out to a separate file. If the file is closed, the temporary FOCUS ENTRY record of the extent of the bad area is lost. If the file is reopened, there is no history or awareness on the FOCUS LIST of the bad area and there will not be any until there is another attempt to navigate into the bad area. At that point, the error routine is triggered and the bad area is discovered and marked again. The present invention does provide for extension to add a SYSTEM object to the TAIL of the MFILE denoting the bad area.

Every error block begins where (and includes) the PREFIX keybyte of some object would be (as viewed from an intact preceding object or from the PREFIX of an intact containing object) and ends where (and includes) the SUFFIX keybyte of some object at the same level would be (as viewed from an intact succeeding object or from the SUFFIX of an intact containing object); thus, when the error block is removed from the file the remaining adjacent and containing objects remain intact.

For error DATA blocks, it is possible to identify when DATA has been added or deleted by referring to the expected DATA length in the PREFIX and SUFFIX. The present invention optionally uses checksums for detection of errors in enclosed DATA or enclosed objects. The checksum is calculated and recorded in the object whenever the object is altered. If an error is detected based on the checksum, the same procedure as for a BRACKETS error above is performed.

Y. Embodiments of the Invention.

The present invention is embodied as computer code. In its operational condition, this computer code is 'object' code or 'executable' code which has been compiled from 'source' code into a form that can be executed on a particular computer platform.

The invention provides predefined file structuring and file access services to other programs. The means by which this access may be obtained can vary in at least the following ways:

1. The invention may be provided as a library of source code, which may be compiled and linked into executable programs on a given computer platform. The using programmer in this instance determines whether the invention will be used by one or many programs.

2. The invention may be provided as a library of compiled object code, which may be compiled and statically linked into executable programs on a given computer platform. In this form the library must be prepared in advance to match the computer and compiler (and possibly also the linker) in use. The using programmer in this instance determines whether the invention will be used by one or many programs.

3. The invention may be provided as a dynamically-linkable library of compiled object code, which may be dynamically linked by as many employing programs as may be operating at a given moment on a given computer platform. In this form the library must be prepared in advance to match the computer and possibly the compiler and the linker in use.

4. The invention may be provided as an independent process to which service requests may be submitted by inter-process communications on a given computer or across a network-type connection between different computers. In this case, the invention will return information to the requesting process to indicate the result of the requested service.

5. The invention may be provided as a device driver which controls all access to a volume of a persistent storage device, such as a magnetic disk or CD-ROM. In this form the operating system of the computer in use must mediate the service calls by processes that can use that computer, and the implementation of the invention must be compiled and linked as an executable device driver suitable for that computer.

Z. Computer System

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Intel, such as the 80386, 80486, or Pentium, executing the OS/2 operating system of International Business Machines of Armonk, N.Y. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images, and in the preferred embodiment of this invention, has a resolution of approximately 1024× 768. Other resolution monitors may be utilized in this invention.

The computer system described above is for purposes of example only. The present invention may be implemented in any type of computer system or programming or processing environment. Thus, a method and apparatus for implementing a file structuring system has been described.

The present invention uses the facilities of the computer hardware to accomplish its operations. For example, the present invention builds its internal control structures, such as FOCUS ENTRY, FOCUS LIST and HANDLE, in main memory 115; it stores objects from main memory 115 to mass storage 112 and retrieves objects from mass storage 112 to main memory 115; and it receives data and commands from computer programs that employ the present invention and which necessarily obtain data and commands through the same above-described computer hardware.

We claim:

1. An article of manufacture comprising:
a computer usable medium having computer readable program code means embodied thereon for causing a computer to represent a file on a computer system, the computer readable program code means in said article of manufacture comprising:
computer readable program code configured to cause said computer to create said file as comprising a plurality of objects;
computer readable program code configured to cause said computer to establish a logical order of said objects of said file;
computer readable program code configured to cause said computer to store said objects of said file in a physical order on a storage means;
said file further comprising a head and a tail, such that in said head physical location of said objects is consistent with the relative logical order of said objects, and said tail comprising objects representing modifications to said file.

2. The article of manufacture of claim 1 wherein said objects comprise container objects and system objects.

3. The article of manufacture of claim 2 wherein said head comprises a container object that itself may contain other container objects, data objects and system objects.

4. The article of manufacture of claim 3 wherein said tail stores objects representing modifications to said file and said objects are stored in a manner that reflects the time sequence in which said modifications occur.

5. The article of manufacture of claim 3 wherein said tail stores objects representing modifications to said file and said objects are stored at the end of the tail in time sequence in which said modifications occur.

6. The article of manufacture of claim 4 wherein said tail includes information of logical position of objects in said tail in said file.

7. The article of manufacture of claim 6 further including the step of periodically merging said head and said tail into said head so that said physical order of objects stored in said head corresponds to said logical order of said objects.

8. The article of manufacture of claim 7 wherein subsequent modifications to said file are permitted to be added to the tail during said step of periodically merging said head and said tail into said head.

9. The article of manufacture of claim 7 wherein said step of periodically merging is referred to as reconstitution and said reconstitution is performed upon occurrence of one of a plurality of events.

10. The article of manufacture of claim 9 wherein said events include the size of said tail exceeding a size threshold, the number of objects in said tail exceeds a predetermined number, a predefined time period has passed since a prior reconstitution, and a predefined ratio of tail size to head size is exceeded.

11. An article of manufacture comprising:
a computer usable medium having computer readable program code means embodied thereon for causing a computer to represent a file on a computer system, the computer readable program code means in said article of manufacture comprising:
computer readable program code configured to cause said computer to create said file as comprising a plurality of objects
computer readable program code configured to cause said computer to establish a logical order of said objects of said file;
computer readable program code configured to cause said computer to store said objects of said file in a physical order on a storage means;
said file comprising a head and a tail, such that in said head physical location of said objects is consistent with the relative logical order of said objects, and said tail comprising objects representing modifications to said file;
computer readable program code configured to cause said computer to periodically merge said head and said tail into said head.

12. The article of manufacture of claim 11 wherein said tail stores objects representing modifications to said file and said objects are stored in a manner that reflects the time sequence in which said modifications occur.

13. The article of manufacture of claim 11 wherein said tail stores objects representing modifications to said file and said objects are stored at the end of the tail in time sequence in which said modifications occur.

14. The article of manufacture of claim 12 wherein said tail includes information of logical position of objects in said tail in said file.

15. The article of manufacture of claim 14 wherein the step of periodically merging said head and said tail is accomplished by the steps of:

(a) preventing alterations to said file;
(b) creating a copy of said file;
(c) rebuilding said copy of said file such that objects in said tail are moved into said head and alterations represented by objects in said tail are executed on said file;
(d) replacing said file with said copy of said file;
(e) resuming alterations to said file.

16. The article of manufacture of claim 15 wherein said step of rebuilding is performed such that said physical order of objects stored in said head corresponds to said logical order of said objects.

17. The article of manufacture of claim 14 further including the steps of:
creating a focus list that includes focus entries that represent the logical ordering and prospective physical placement of objects in said file.

18. The article of manufacture of claim 17 wherein said step of periodically merging said head and said tail is accomplished by the steps of:
(a) suspending alterations to said file;
(b) creating a second focus list of said focus entries of said focus list necessary for said merging;
(c) opening a second file;
(d) copying objects from said file to said second file such that objects in said second file represent a merger of said head and said tail;
(e) merging said focus list and said focus list, omitting unnecessary entries;
(f) replacing said file with said second file;
(g) resuming alterations to said file;
(h) deleting said second focus list.

19. An article of manufacture comprising:
a computer usable medium having computer readable program code means embodied thereon for causing a computer to provide an object-oriented file structuring system for storing a file in a computer system, the computer readable program code means in said article of manufacture comprising:
computer readable program code configured to cause said computer to provide a file to be stored in said computer system comprising plurality of objects, each object having an object length, said file comprising a head and a tail;
computer readable program code configured to cause said computer to establish said head where physical location of said objects is consistent with the relative logical order of said objects;
computer readable program code configured to cause said computer to establish said tail as comprising objects representing modifications to said file;
computer readable program code configured to cause said computer to create a focus list of focus entries for said file when said fie is open;
each focus entry representing an object in said file;
said objects including container objects, system objects, and data objects;
system objects and data objects being contained in said container objects;
container objects for containing data objects, system objects and other container objects;
computer readable program code configured to cause said computer to define an object as in focus when said object is accessed;
computer readable program code configured to cause said computer to create a focus entry for an object when it or any objects contained by it are in focus;
computer readable program code configured to cause said computer to create a focus entry for an object when it has been deleted prior to a reconstitution;
computer readable program code configured to cause said computer to create a focus entry for each object in said tail;
computer readable program code configured to cause said computer to remove a focus entry from said focus list when an object associated with said focus entry is not in focus and when said object is not used as a point of reference to establish the logical order of a new object being added to said tail.

20. The article of manufacture of claim 19 wherein said focus entry comprises a user count, object information, flags, and a magic string and said flags indicate pending replacement or removal of said object, or addition of a new object logically placed before or after said object.

* * * * *